US011847309B1

(12) United States Patent
Scheuregger

(10) Patent No.: US 11,847,309 B1
(45) Date of Patent: Dec. 19, 2023

(54) AUDITORY MEMORIES

(71) Applicant: Bang & Olufsen, A/S, Struer (DK)

(72) Inventor: Oliver Scheuregger, Valby (DK)

(73) Assignee: Bang & Olufsen, A/S, Struer (DK)

( * ) Notice: Subject to any disclaimer, the term of this patent is extended or adjusted under 35 U.S.C. 154(b) by 0 days.

(21) Appl. No.: 18/157,445

(22) Filed: Jan. 20, 2023

(51) Int. Cl.
*G06F 3/04847* (2022.01)
*G11B 27/031* (2006.01)
*G06F 3/0482* (2013.01)

(52) U.S. Cl.
CPC ........ *G06F 3/04847* (2013.01); *G06F 3/0482* (2013.01); *G11B 27/031* (2013.01)

(58) Field of Classification Search
CPC .. G06F 3/0482; G06F 3/04847; G11B 27/031
See application file for complete search history.

(56) References Cited

U.S. PATENT DOCUMENTS

| | | | | |
|---|---|---|---|---|
| 2018/0366144 | A1* | 12/2018 | Ashoori | G16H 40/63 |
| 2019/0171409 | A1* | 6/2019 | Boulanger | H04H 60/35 |
| 2021/0249035 | A1* | 8/2021 | Bone | G10L 25/63 |
| 2022/0157348 | A1* | 5/2022 | Robert Jose | H04N 21/25883 |

OTHER PUBLICATIONS

Ling Ma, "Acoustic environment classification," ACM Transactions on Speech and Language Processing vol. 3Issue 2pp. 1-22https://doi.org/10.1145/1149290.1149292 [Abstract Only].

Brian Clarkson et al., "Auditory Context Awareness via Wearable Computing," Perceptual Computing Group and Speech Interface Group, MIT Media Laboratory, pp. 1-6.
"DCASE2022 Challenge: IEEE AASP Challenge on Detection and Classification of Acoustic Scenes and Events," DCASE2023, Dated: Mar. 15-Jul. 1, 2022, pp. 1-8.
Claire Sanford, "Introduction to Speech Recognition Algorithms: Learn How it has Evolved," Rev, Dated: Jul. 26, 2021, pp. 1-14.
Sirisha Rella, "Essential Guide to Automatic Speech Recognition Technology," Nvidia Developer: Technical Blog, Dated: Aug. 8, 2022, pp. 1-6.
Anmol Gulati et al., "Conformer: Convolution-augmented Transformer for Speech Recognition," arXiv.org, Dated: May 16, 2020, pp. 1-5.

(Continued)

*Primary Examiner* — Seth A Silverman
(74) *Attorney, Agent, or Firm* — Patterson & Sheridan, LLP

(57) ABSTRACT

Techniques for generating an auditory memory for an auditory event are described. An example technique includes obtaining a first audio content associated with an event in an environment. At least one attribute of the environment is determined, based on evaluating the first audio content. At least one emotional attribute associated with the event in the environment is determined, based on evaluating the first audio content. A second audio content is determined, based at least in part on the at least one attribute of the environment. A third audio content is determined, based at least in part on the at least one emotional attribute. An auditory memory including fourth audio content associated with the event in the environment is generated, based on the first audio content, the second audio content, and the third audio content.

20 Claims, 21 Drawing Sheets

(56) References Cited

OTHER PUBLICATIONS

Somshubra Majumdar et al., "Citrinet: Closing the Gap between Non-Autoregressive and Autoregressive End-to-End Models for Automatic Speech Recognition," arXiv.org, Dated: Apr. 5, 2021, pp. 1-5.

Samuel Kriman et al., "Quartznet: Deep Automatic Speech Recognition with 1D Time-Channel Separable Convolutions," arXiv.org, Dated: Oct. 22, 2019, pp. 1-5.

Ali Yadollahi et al., "Current State of Text Sentiment Analysis from Opinion to Emotion Mining," ACM Comput. Surv. 50, 2, Article 25 (May 2017), 33 pages.

Hatzivassiloglou, Vasileios, and Janyce Wiebe. "Effects of adjective orientation and gradability on sentence subjectivity." Coling 2000 vol. 1: The 18th International Conference on Computational Linguistics. 2000.

Mullen, Tony, and Nigel Collier. "Sentiment analysis using support vector machines with diverse information sources." Proceedings of the 2004 conference on empirical methods in natural language processing. 2004.

Whitelaw, Casey, Navendu Garg, and Shlomo Argamon. "Using appraisal groups for sentiment analysis." Proceedings of the 14th ACM international conference on Information and knowledge management. 2005.

"Speech Emotion Recognition Project using Machine Learning: Solved End-to-End Speech Emotion Recognition Project using Machine Learning in Python," ProjectPro, Dated: Feb. 2, 2023, pp. 1-17.

Schröder, Marc. "Emotional speech synthesis: A review." Seventh European Conference on Speech Communication and Technology. 2001.

Han, Kun, Dong Yu, and Ivan Tashev. "Speech emotion recognition using deep neural network and extreme learning machine." Interspeech 2014. 2014.

Huang, Zhengwei, et al. "Speech emotion recognition using CNN." Proceedings of the 22nd ACM international conference on Multimedia. 2014.

Vadim Nickel, "Conception and Evaluation of a Procedural Music System for Engagement with Player Emotion and Memory in Digitial Games," ResearchGate.com, Dated: Sep. 17, 2021, pp. 1-57.

López Ibáñez, Manuel, Nahum Álvarez, and Federico Peinado. "Towards an emotion-driven adaptive system for video game music." Advances in Computer Entertainment Technology: 14th International Conference, ACE 2017, London, UK, Dec. 14-16, 2017, Proceedings 14. Springer International Publishing, 2018.

Krothapalli, Sreenivasa Rao, and Shashidhar G. Koolagudi. Emotion recognition using speech features. Springer, New York, 2013. [Abstract Only].

Cowie, Roddy, et al. "Emotion recognition in human-computer interaction." IEEE Signal processing magazine 18.1 (2001): 32-80.

Mao, Qirong, et al. "Learning salient features for speech emotion recognition using convolutional neural networks." IEEE transactions on multimedia 16.8 (2014): 2203-2213.

Nitin Sawhney et al., "Situational Awareness from Enviromental Sounds," ResearchGate.com, Dated: Dec. 1998, pp. 1-8.

* cited by examiner

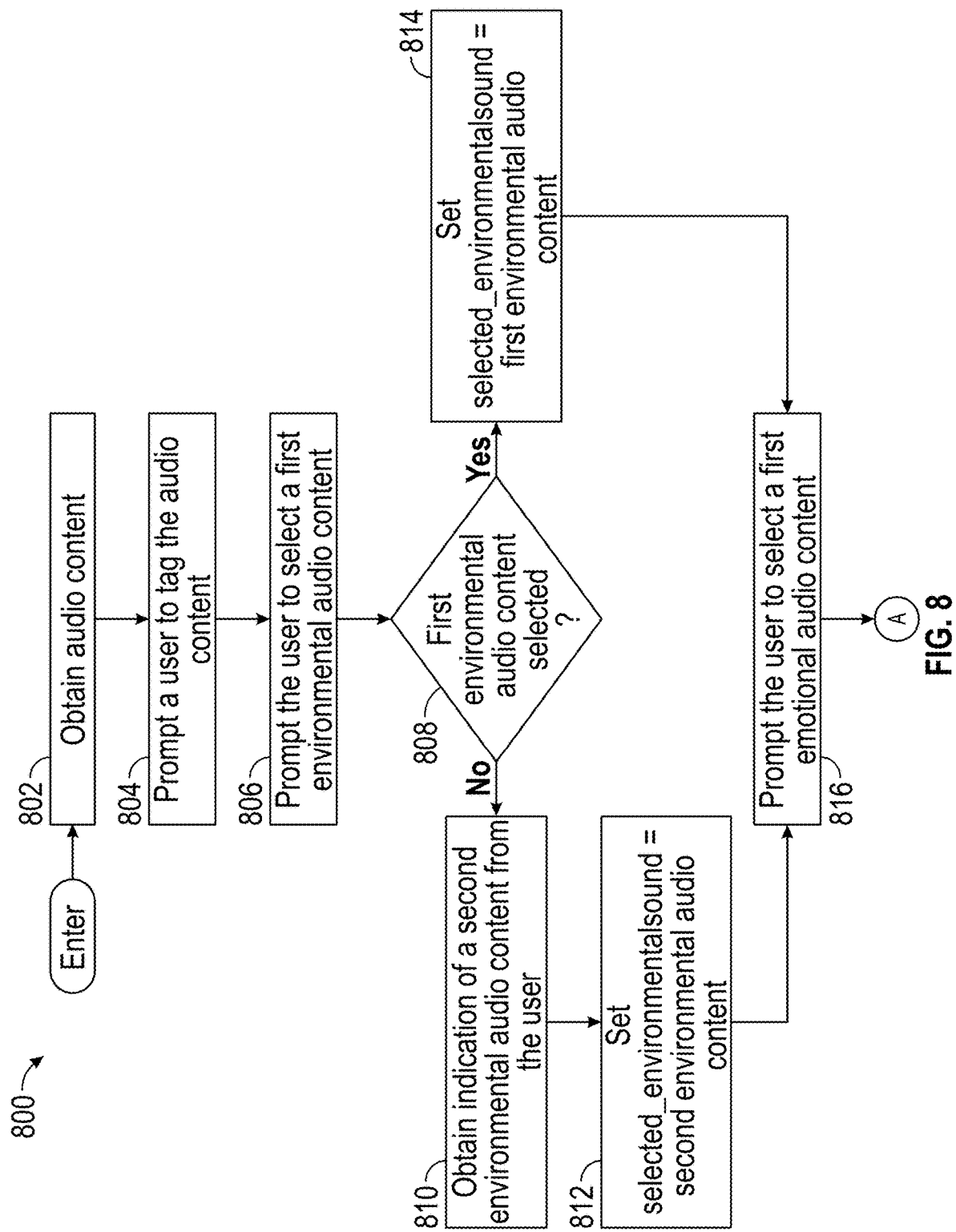

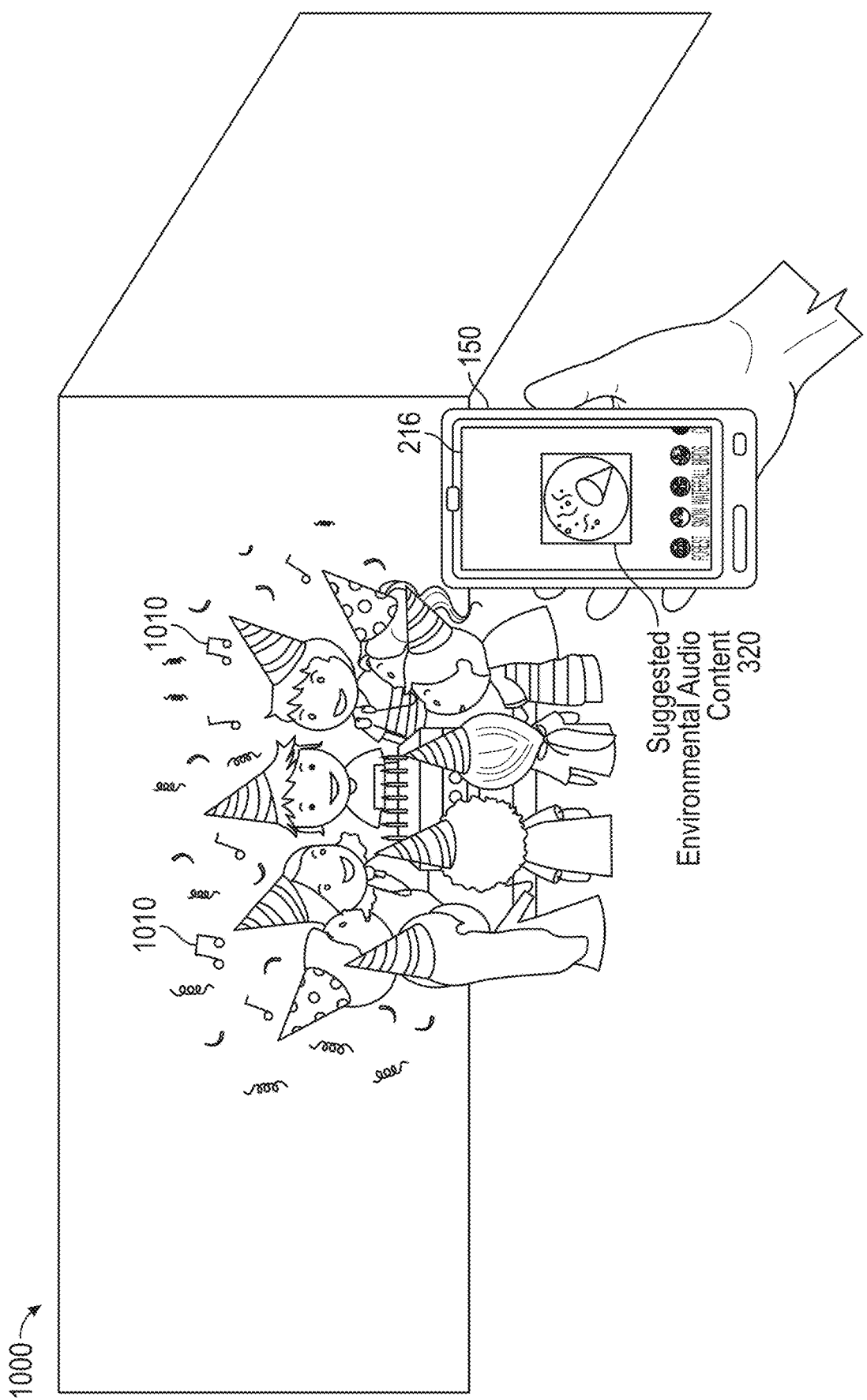

US 11,847,309 B1

AUDITORY MEMORIES

INTRODUCTION

Field of the Disclosure

The present disclosure generally relates to audio processing techniques, and more specifically, to techniques for generating an auditory memory associated with an auditory event.

Background

Today, users can employ various computing devices (e.g., smartphones, tablets, cameras, video cameras, audio recorders, and similar devices) to capture events of importance or significance to the user. Such events can include, but are not limited to, birthdays, graduations, parties, and other important events. In an exemplary scenario, a user's smartphone can record media (e.g., audio, video, or a combination of audio and video) associated with an event and can store the media in a storage system. The storage system may be a local storage system or an external storage system. The user can retrieve the media from the storage system and consume the media via the user's smartphone or another computing device at a later time.

SUMMARY

One embodiment described herein is a computer-implemented method performed by a computing device. The computer-implemented method includes obtaining a first audio content. The first audio content is associated with an event in an environment. The computer-implemented method also includes determining at least one attribute of the environment, based on evaluating the first audio content with a first machine learning (ML) algorithm. The computer-implemented method further includes determining at least one emotional attribute associated with the event in the environment, based on evaluating the first audio content with a second ML algorithm. The computer-implemented method further includes determining a second audio content, based at least in part on the at least one attribute of the environment. The computer-implemented method further includes determining a third audio content, based at least in part on the at least one emotional attribute. The computer-implemented method further includes generating an auditory memory comprising fourth audio content associated with the event in the environment, based on the first audio content, the second audio content, and the third audio content.

Another embodiment described herein is a computing device. The computing device includes a processor and a memory. The memory stores instructions, which when executed on the processor perform an operation. The operation includes obtaining a first audio content. The first audio content is associated with an event in an environment. The operation also includes determining at least one attribute of the environment, based on evaluating the first audio content with a first machine learning (ML) algorithm. The operation further includes determining at least one emotional attribute associated with the event in the environment, based on evaluating the first audio content with a second ML algorithm. The operation further includes determining a second audio content, based at least in part on the at least one attribute of the environment. The operation further includes determining a third audio content, based at least in part on the at least one emotional attribute. The operation further includes generating an auditory memory comprising fourth audio content associated with the event in the environment, based on the first audio content, the second audio content, and the third audio content.

Another embodiment described herein is a non-transitory computer-readable medium. The non-transitory computer-readable medium includes computer executable code, which when executed by one or more processors, performs an operation. The operation includes obtaining a first audio content. The first audio content is associated with an event in an environment. The operation also includes determining at least one attribute of the environment, based on evaluating the first audio content with a first machine learning (ML) algorithm. The operation further includes determining at least one emotional attribute associated with the event in the environment, based on evaluating the first audio content with a second ML algorithm. The operation further includes determining a second audio content, based at least in part on the at least one attribute of the environment. The operation further includes determining a third audio content, based at least in part on the at least one emotional attribute. The operation further includes generating an auditory memory comprising fourth audio content associated with the event in the environment, based on the first audio content, the second audio content, and the third audio content.

The following description and the appended figures set forth certain features for purposes of illustration.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 10A, FIG. 10B, FIG. 10C, and FIG. 10D illustrate an example scenario for generating an auditory memory for an auditory event, according to one embodiment.

DETAILED DESCRIPTION

Embodiments described herein provide techniques for generating an auditory memory associated with an auditory event. More specifically, embodiments provide techniques for capturing an auditory event (e.g., audio content associated with an event, such as a graduation, birthday party, sporting event, child's first words, and other events) and mixing and editing the auditory event with additional audio content to generate an auditory memory for the auditory event.

Figure 1A:
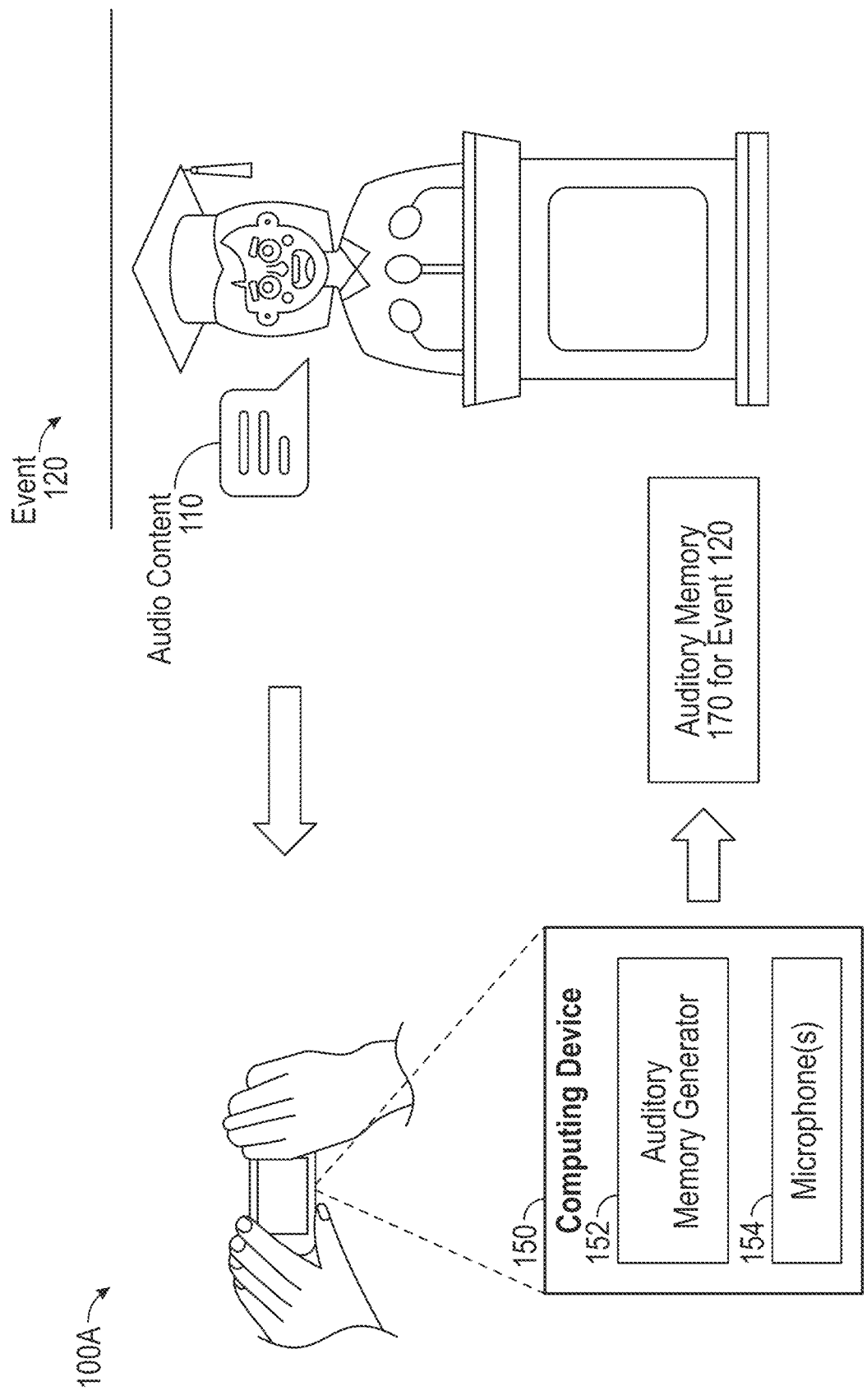
FIG. 1A, FIG. 1B, and FIG. 1C illustrate an example scenario for generating an auditory memory for an auditory event, according to one embodiment.
Figure 1B:
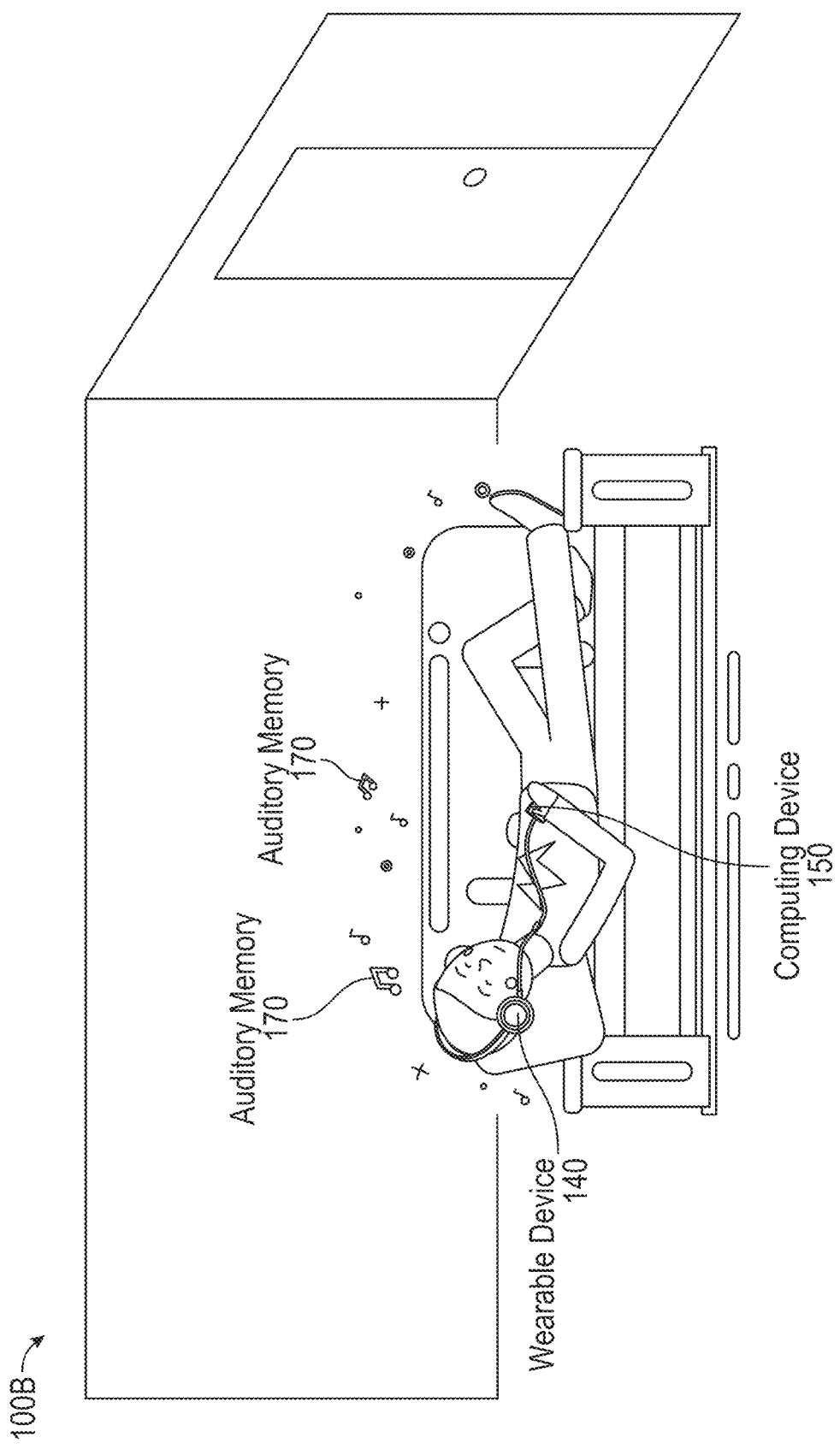
Figure 1C:
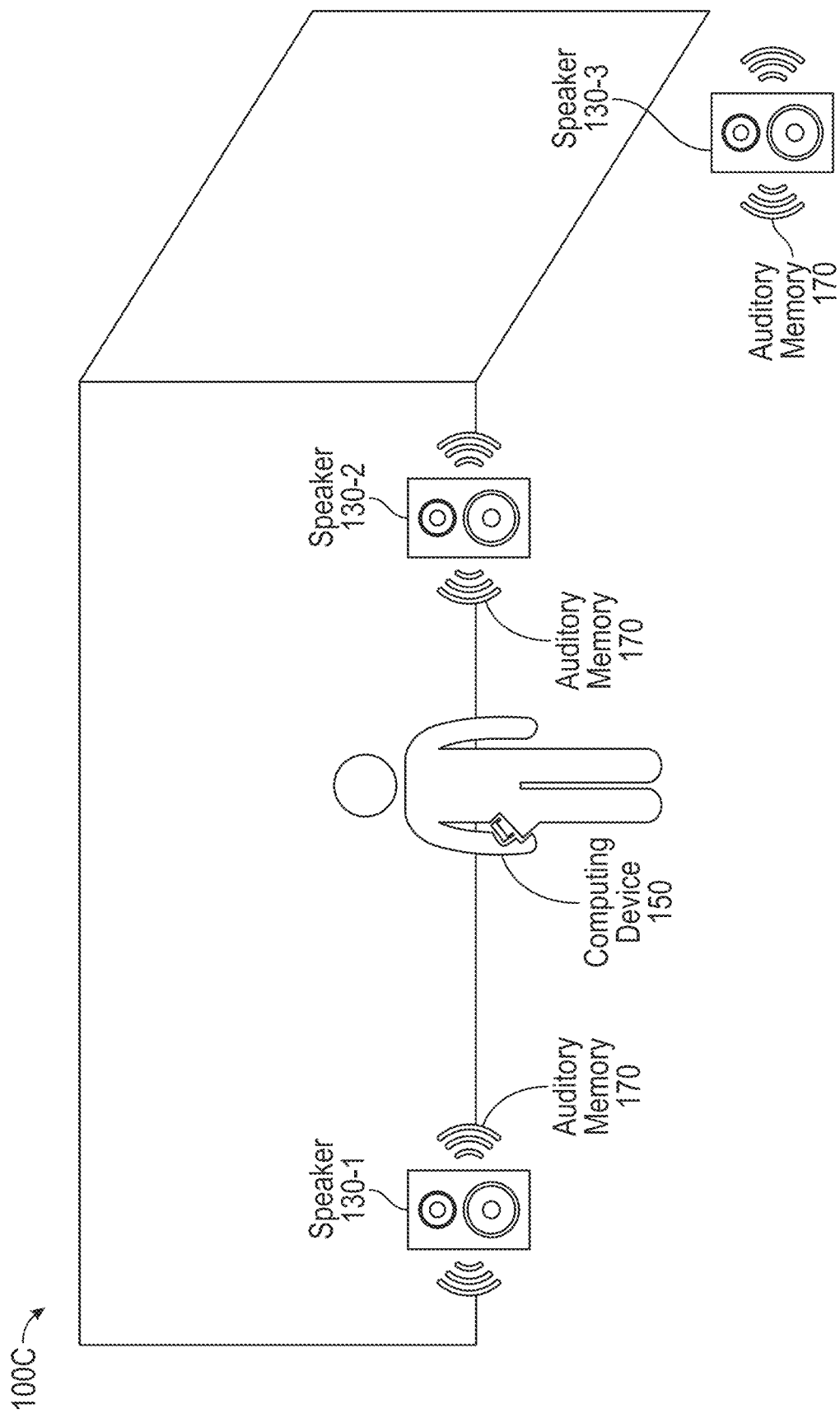

FIGS. 1A-1C illustrate an example scenario for generating an auditory memory for an auditory event, according to one embodiment. In the scenario depicted in FIG. 1A, a user attends an event 120 (e.g., graduation) within environment 100A and uses their computing device 150 (e.g., smartphone) to capture the event 120. In particular, the user may record the audio content 110 (e.g., speech or voice content of the graduation speaker's speech) from the event 120 using a microphone(s) 154 of the computing device 150. The audio content 110 may be stored in a storage system that is accessible to the computing device 150.

In one embodiment described herein, the computing device 150 includes an auditory memory generator 152, which is configured to evaluate the audio content 110 using one or more artificial intelligence (AI)/machine learning (ML) techniques to determine additional audio content that is associated with the captured audio content 110. For example, the auditory memory generator 152 may employ ML algorithms to predict attributes regarding the physical environment 100A in which the audio content 110 was captured, as well as the underlying emotion of the event 120. For event 120, which is a "graduation," the auditory memory generator 152, via the ML algorithm(s), may classify the environment as "indoor" and the emotional context as "excited."

The auditory memory generator 152 may also suggest, based on the predicted attributes regarding the physical environment 100A and emotional context, relevant sounds that may be used to enhance and/or augment the captured audio content 110. That is, the auditory memory generator 152 can provide predictions regarding the physical environment 100A in which the input audio content 110 was recorded, as well as the underlying emotion of the acoustic scene. Continuing with the exemplary event of a graduation, the auditory memory generator 152 may suggest contextual environmental sound clips and emotional sounds, such as a "ceremony" soundscape and "jovial excited" music, respectively. In this example, the "ceremony" soundscape and "jovial excited" music are coherent with the physical environment 110A and the emotional context of the event 120 in which the audio content 110 was captured in. The auditory memory generator 152 may present a user interface (e.g., on a screen of the computing device 150) that allows the user to select the suggested audio clips or override the suggestion by selecting other audio clips. The user interface may also allow the user to mix the captured audio content 110 and the suggested sound clips. For example, the user interface may allow the user to position and modify how the sounds are rendered via headphones or loudspeakers.

Once the audio is mixed, the auditory memory generator 152 may store the final mix output as an auditory memory 170 for the event 120. The auditory memory 170 may be stored in a format that can be distributed and reproduced on the user's computing device 150 (e.g., smartphone) as well as other computing devices (e.g., laptop, wearable device, television, loudspeakers). A user may retrieve the auditory memory 170 at a later time and listen to the auditory memory 170 in order to re-experience the moment associated with the event 120. In one example shown in FIG. 1B, the user may listen to the auditory memory 170 in the environment 100B using a wearable device 140. In another example shown in FIG. 1C, the user may listen to the auditory memory 170 in the environment 100C using speaker devices 130 1-3.

In this manner, embodiments described herein provide techniques that allow a user to create and archive a unique recording of a specific event as an "auditory memory" so that the user can re-experience the specific event at a later time and/or within a different environment. As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 2:
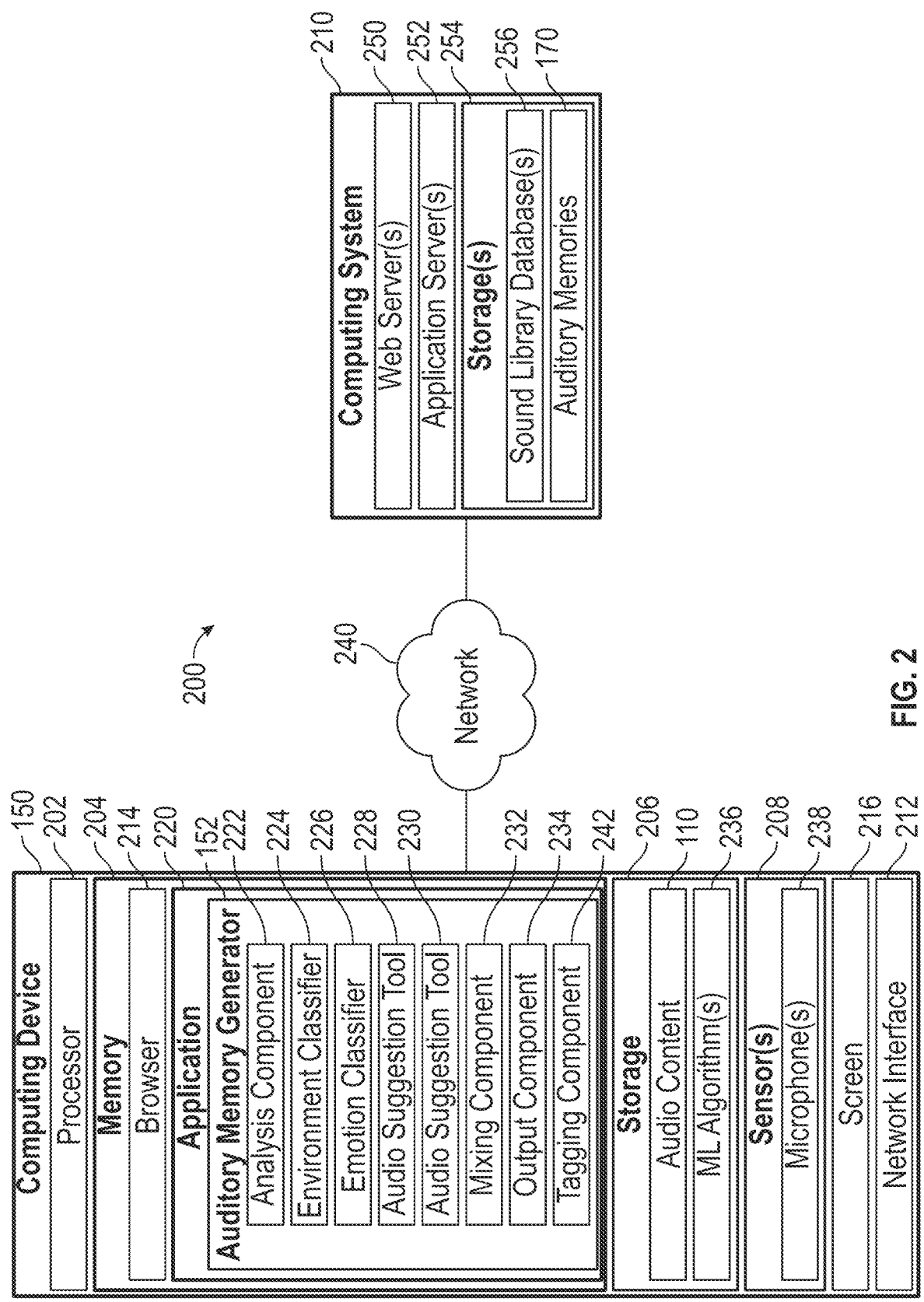
FIG. 2 illustrates an example computing environment for generating an auditory memory for an auditory event, according to one embodiment.

FIG. 2 illustrates an example of a computing environment 200 used to generate auditory memories for auditory events, according to one embodiment. As shown, the computing environment 200 includes a computing device 150 and a computing system 210, which are interconnected via a network 240. The network 240, in general, may be a wide area network (WAN), a local area network (LAN), a wireless LAN, a personal area network (PAN), a cellular network, etc. In a particular embodiment, the network 240 is the Internet.

Computing device 150 is generally representative of a mobile or handheld computing device, including, for example, a smartphone, a tablet, a laptop computer, etc. Here, the computing device 150 includes a processor 202, a memory 204, a storage 206, one or more sensors 208, a screen 216, and a network interface 212. The processor 202 represents any number of processing elements, which can include any number of processing cores. The memory 204 can include volatile memory, non-volatile memory, and combinations thereof.

The memory 204 generally includes program code for performing various functions related to applications (e.g., application 220, browser 214) hosted on the computing device 150. The program code is generally described as various functional "applications" or "modules" within the memory 204, although alternate implementations may have different functions or combinations of functions. Here, the memory 204 includes a browser 214 and an application 220. The application 220 is configured to generate an auditory memory for an auditory event. Here, the application 220 includes an analysis component 222, an environment classifier 224, an emotion classifier 226, an audio suggestion tool 228, an audio suggestion tool 230, a mixing component 232, an output component 234, and a tagging component 242, each of which is a software component and is described in greater detail below.

The browser 214 may be used to access the computing system 210 by rendering web pages received from the computing system 210. The application 220 may be representative of a component of a client server application or other distributed application which can communicate with the computing system 210 over the network 240. Application 220 may be a "thin" client where the processing is largely directed by the application 220, but performed by computing systems, or a conventional software application installed on the computing device 150.

The storage 206 may be a disk drive storage device. Although shown as a single unit, the storage 206 may be combination of fixed and/or removable storage devices, such as fixed disc drives, removable memory cards, optical storage, network attached storage (NAS), or a storage area network (SAN). Here, the storage 206 includes audio content 110 and one or more ML algorithms 236, which are described in greater detail herein. The network interface 212 may be any type of network communications interface that allows the computing device 150 to communicate with other computers and/or components in the computing environment 200 via a data communications network (e.g., network 240).

The screen 216 may include a Liquid Crystal Display (LCD), a Light Emitting Diode (LED), or other display technology. In one embodiment, the screen 216 includes a touch-screen interface. The sensor(s) 208 includes one or more microphone(s) 238 for recording audio content. In general, however, the sensor(s) 208 can include other types of sensors, including, for example, an accelerometer, gyroscope, global positioning sensor (GPS), inertial motion unit (IMU), or any sensor that is configured to sense information from the physical environment.

As shown, the computing system 210 includes a web server(s) 250, an application server(s) 252, and a storage(s) 254. In this example, the computing system 210 is generally modeled as a service back-end (e.g., web server, application server, and a database). Of course, other software architectures or distributed application frameworks could be used. Web server(s) 250 and application server(s) 252 are representative of physical computing systems, as well as representative of virtual machine instances deployed to a computing cloud. Similarly, the storage(s) 254 can be located on a single computing system or distributed across multiple computing systems. Here, the storage(s) 254 includes a sound library database(s) 256 and one or more auditory memories 170. The sound library database(s) 256 includes audio clips and other audio content. The web server(s) 250 may communicate with the application server(s) 252 to respond to requests from applications on the computing device 150.

The application server(s) 252 may respond to requests from computing devices by generating hypertext markup language (HTML) and related content passed to computing devices (via the web server 250) and rendered as a user interface (e.g., pages, including windows, text fields, and so on, along with scripts or applets or widgets executed by a web browser). In some cases, the application 220 could generate information or application content to present data retrieved from the application server 252. In general, the application server 252 may be implemented using any suitable software programming language, application framework, web service solution stack, virtual application containers, etc., in order to present application features and content to a computing device.

In some cases, the application server 252 may include graphical user interface (GUI) components that can be presented on the computing device 150, e.g., for allowing a user to browse and select audio content to listen to. The GUI components may include, for example, HTML components or code that generates HTML components that can be passed to the computing device 150 and rendered as a user interface. The GUI components may additionally include instructions executable by the computing device 150 to display a user interface using language-specific or operating system-specific GUI components (e.g., Abstract Window Toolkit, Swing API components on the Java platform, and so on). Generally, instructions capable of rendering a GUI on the computing device 150 may include computer executable code generated from compiling and/or interpreting C (or variants thereof), Java, PHP, Ruby, HTML, javascript, Python, AJAX, VBscript, and other programming or scripting languages used to compose and present a GUI. In an example music application, the application server 252 components may include pages that display suggested audio clips associated with the captured audio content 110. In some embodiments, the application server 252 components include prompts (e.g., icons, text, buttons, etc.) that allow the user to search, browse, and select different audio clips to mix with the captured audio content 110.

Note that FIG. 2 illustrates a reference example of a computing environment 200 in which the techniques presented herein can be implemented and that the techniques presented herein can be implemented in other computing environments.

Figure 3:
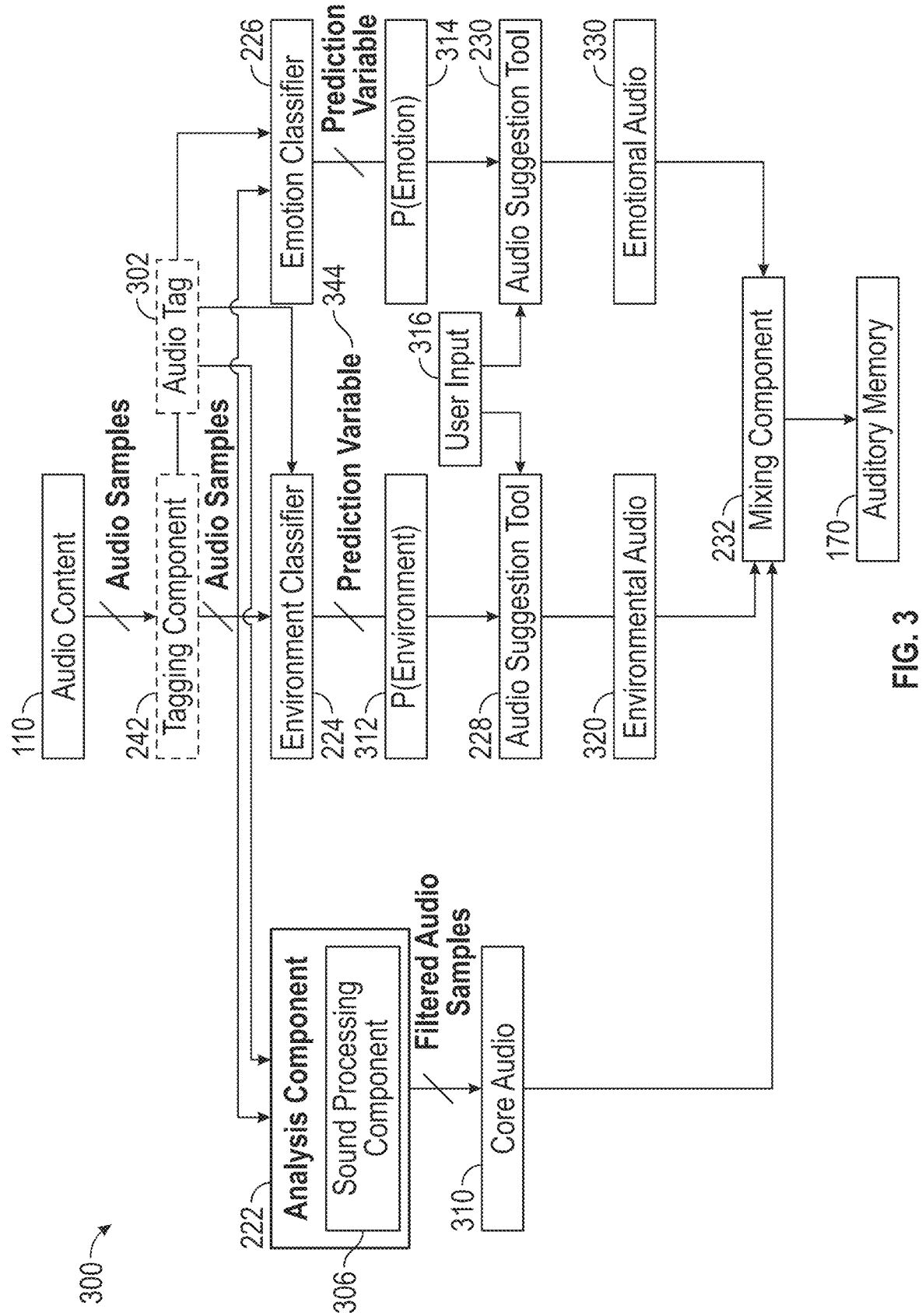
FIG. 3 illustrates an example workflow for generating an auditory memory for an auditory event, according to one embodiment.

FIG. 3 illustrates an example workflow 300 for generating an auditory memory 170 for an auditory event, according to one embodiment. In the workflow 300, the tagging component 242 is configured to generate one or more audio tags 302, based on the audio content 110. In particular, the tagging component 242 may receive audio samples of the audio content 110 and may output the audio tag(s) 302 associated with the audio samples. The audio tag(s) 302 may be user-defined, prompted by the tagging component 242, or a combination thereof. Note that, in some embodiments, the tagging component 242 is skipped by the workflow 300. In such embodiments, the audio tag(s) 302 may not be generated and sent to the analysis component 222, environment classifier 224, and emotion classifier 226.

The audio content 110 and the audio tag(s) 302 (if available) are provided to the analysis component 222, the environment classifier 224, and the emotion classifier 226. The analysis component 222 is configured to perform audio processing on the audio content 110. The audio processing may be performed to filter the input signal to ensure that what is left represents the key acoustic elements of the auditory memory. For example, the analysis component 222 includes a sound processing component 306, which is configured to apply at least one of noise suppression or speech enhancement to the audio content 110. After performing the audio processing, the analysis component 222 outputs a set of filtered audio samples, referred to herein as Core Audio 310.

The environment classifier 224 is configured to analyze the audio content 110 to predict the environment (e.g., environment 100A) in which the audio content 110 was recorded. The environment classifier 224 may analyze the audio content 110 using one or more ML algorithms, examples of which can include, but are not limited to, Hidden Markov Model (HMM) classifier, recurrent neural networks (RNNs), nearest neighbor, and power spectral density (PSD)-neural network (NN) (PSD-NN). The environment classifier 224 outputs an environment prediction variable, referred to as P(Environment) 312, which is a text tag that describes the most likely environment in which the audio content 110 was recorded. In embodiments in which the environment classifier 224 receives an audio tag 302, the environment classifier 224 can use the audio tag 302 as additional metadata that is input into the ML algorithm(s) to determine P(Environment) 312. Note, the environment classifier 224 is described in greater detail below with respect to FIG. 4.

The emotion classifier 226 is configured to analyze the audio content 110 to predict the underlying emotional context in which the audio content 110 was recorded. The emotion classifier 226 may analyze the audio content 110 using one or more ML algorithms configured to perform speech emotion recognition. Examples of such ML algorithms can include, but are not limited to, RNNs, Long short-term memory (LSTM) networks, Attention-based models, and Listen-Attend-Spell (LAS). The emotion classifier 226 outputs an emotion prediction variable, referred to as P(Emotion) 314, which is a text tag that describes the most likely emotion associated with the audio content 110. In embodiments in which the emotion classifier 226 receives an audio tag 302, the emotion classifier 226 can use the audio tag 302 as additional metadata that is input into the ML algorithm(s) to determine P(Emotion) 314. Note, the emotion classifier 226 is described in greater detail below with respect to FIG. 5.

The audio suggestion tool 228 is configured to suggest a set of audio content, based on the environment prediction variable P(Environment) 312 and user input 316. In one embodiment, the audio suggestion tool 228 uses P(Environment) 312 to select and suggest sample sound clips from a sound library database to the user. For example, if P(Environment) is "city park," the audio suggestion tool 228 may propose three relevant sound clips associated with "city park," from a database. The audio suggestion tool 228 may output the sound clip that is selected by the user (e.g., from user input 316) as environmental audio 320.

In another embodiment, rather than selecting audio content from a database, the audio suggestion tool 228 uses a generative audio model 656-2 to generate a set of audio content, based on P(Environment) 312. Examples of such generative audio models 656 include, but are not limited to, diffusion-based generative models and auto-regressive generative models. In one example, if P(Environment) 312 is "city park," the audio suggestion tool 228 can input the P(Environment) 312 into the generative audio model 656-2 and generate a set of relevant sound clips associated with "city park." The audio suggestion 228 may output the sound clip that is selected by the user (e.g., from user input 316) as environmental audio 320.

The audio suggestion tool 230 is configured to suggest a set of audio content, based on the emotion prediction variable P(Emotion) 314 and user input 316. For example, the audio suggestion tool 230 may use P(Emotion) 314 to select and suggest sample sound clips from a sound library database to the user. For example, if P(Emotion) is "excited," the audio suggestion tool 228 may propose three relevant sound clips associated with "excited" emotions from a database. The audio suggestion tool 230 may output the sound clip that is selected by the user (e.g., from user input 316) as emotional audio 330.

In another embodiment, rather than selecting audio content from a database, the audio suggestion tool 230 uses a generative audio model 656-1 (e.g., diffusion-based generative model, auto-regressive generative model) to generate a set of audio content, based on P(Emotion) 314. In one example, if P(Emotion) 314 is "excited," the audio suggestion tool 230 can input P(Emotion) 314 into the generative audio model 656-1 and generate a set of relevant sound clips associated with "excited" emotions. The audio suggestion 230 may output the sound clip that is selected by the user (e.g., from user input 316) as emotional audio 330.

The core audio 310, environmental audio 320, and emotional audio 330 are fed into the mixing component 232, which is configured to mix the core audio 310, environmental audio 320, and the emotional audio 330 into a mixed audio content. As described below, the mixing component 232 may provide various application programming interfaces (APIs) that allow the user to control and define how the sounds (e.g., core audio 310, environmental audio 320, and emotional audio 330) are combined and rendered. The mixed audio content may then be sent to an encoder to generate a bit stream, referred to as auditory memory 170. In one embodiment, the mixing component 232 employs standard channel-based encoders, such as AAC or MP3. In another embodiment, the mixing component 232 employs object-based formats, such as MPEG-H. The mixing component 232 may upload the generated auditory memory 170 to a server or distribute the generated auditory memory 170 locally.

Figure 4:
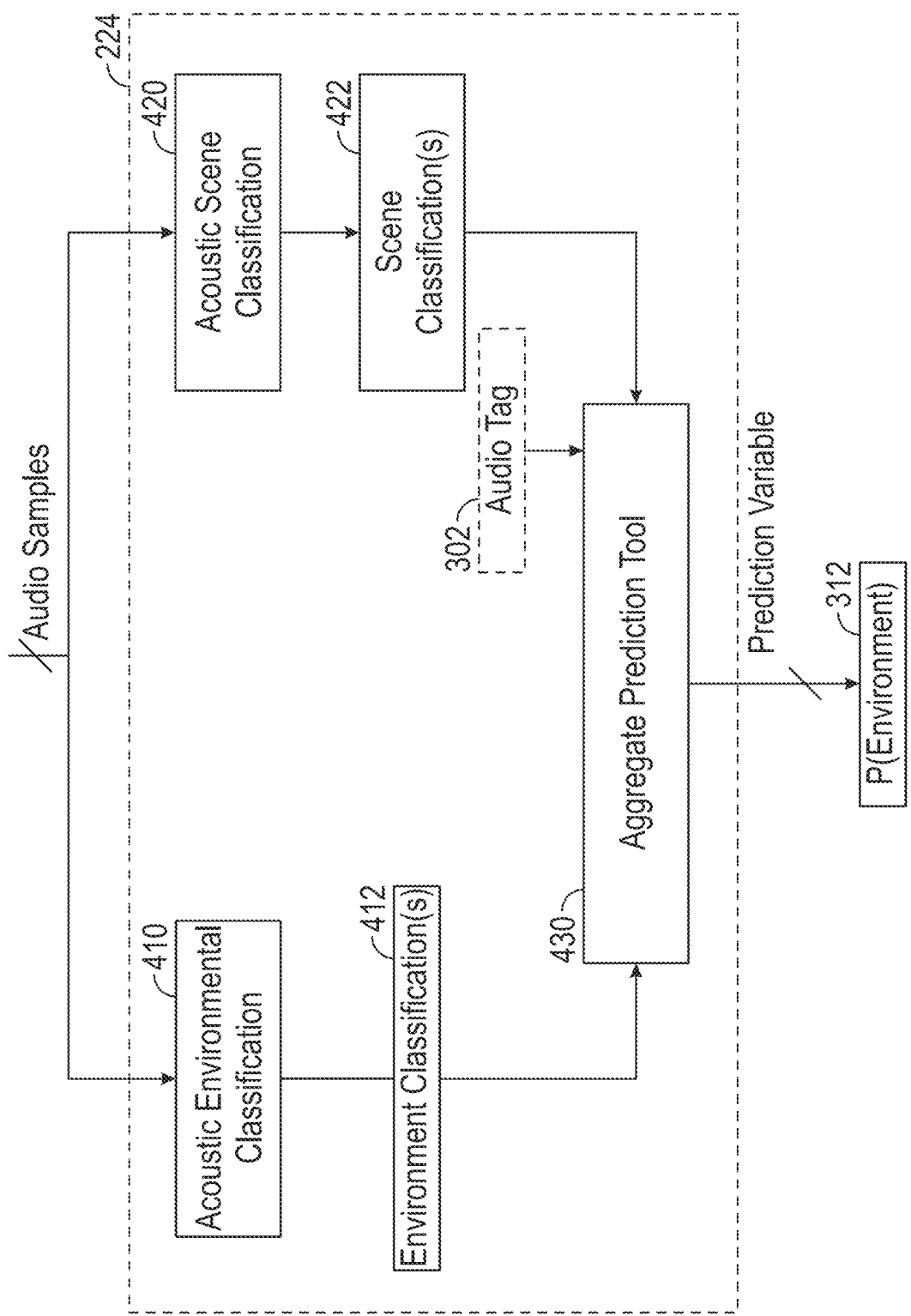
FIG. 4 further illustrates certain components of the workflow illustrated in FIG. 3, according to one embodiment.

FIG. 4 further illustrates certain components of the environment classifier 224 of the workflow 300, described relative to FIG. 3, according to one embodiment. As shown, the environment classifier 224 includes an acoustic environmental classification component 410, an acoustic scene classification component 420, and an aggregate prediction tool 430. In one embodiment, the acoustic environmental classification component 410 is configured to predict the environment in which the audio content 110 is recorded. For example, the acoustic environmental classification component 410 may employ a ML algorithm to determine an environment classification 412 associated with the audio content 110.

In one embodiment, the acoustic scene classification component 420 is configured to provide additional contextual information regarding the environment in which the audio content 110 is recorded. For example, the acoustic scene classification component 420 may map the audio samples to one or more target sound event classes, examples of which can include, clapping, laughter, music, speech, bells, and other classes. The acoustic scene classification component 420 outputs the scene classification(s) 422 for the audio content 110. The aggregate prediction tool 430 is configured to aggregate the outputs from the acoustic environment classification component 410, the acoustic scene classification component 420, and the audio tag 302 (if available), and compute the prediction variable P(Environment) 312.

Figure 5:
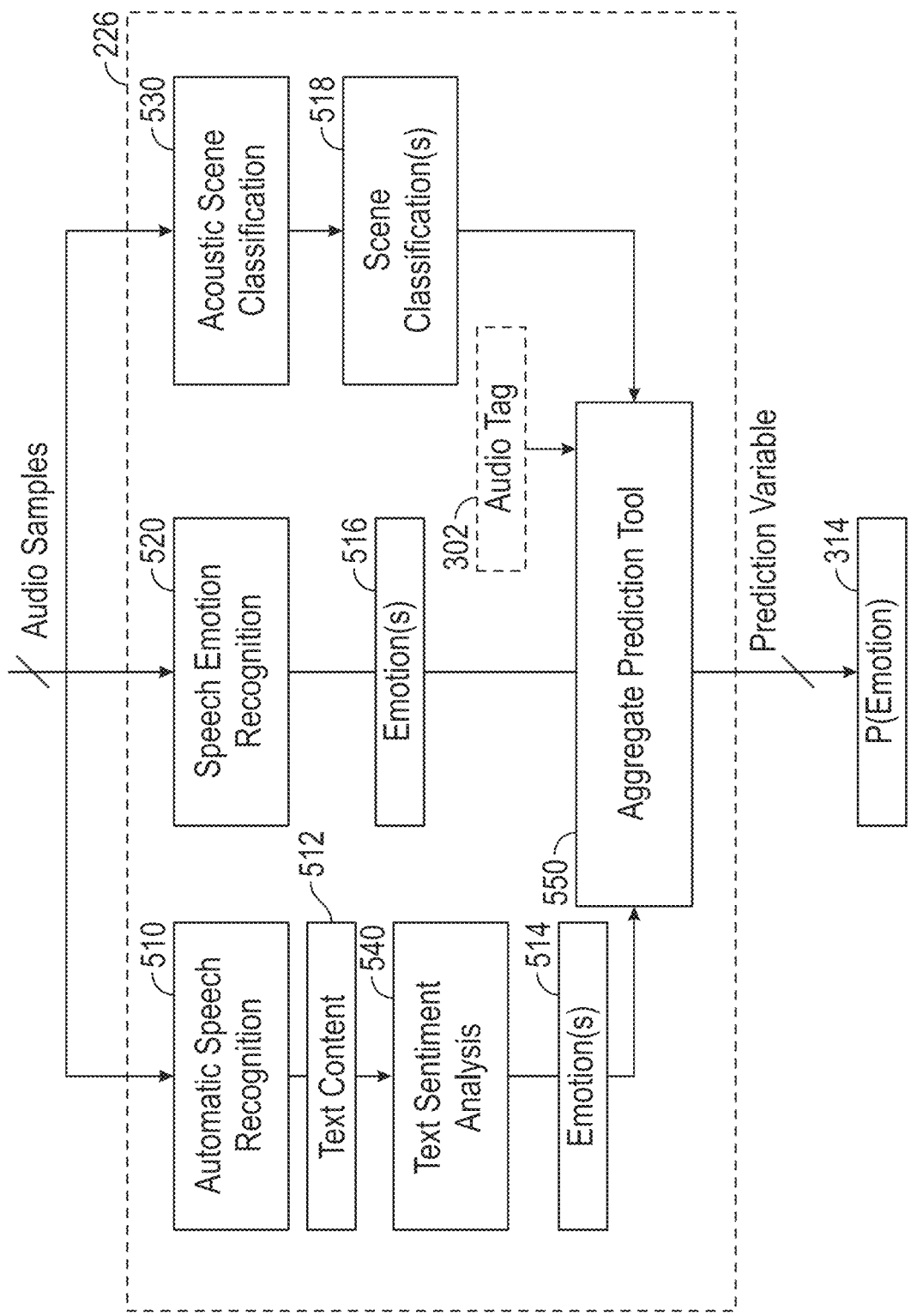
FIG. 5 further illustrates certain components of the workflow illustrated in FIG. 3, according to one embodiment.

FIG. 5 further illustrates certain components of the emotion classifier 226 of the workflow 300, described relative to FIG. 3, according to one embodiment. As shown, the emotion classifier 226 includes an automatic speech recognition component 510, a speech emotion recognition component 520, a text sentiment analysis component 540, and an aggregate prediction tool 550.

In one embodiment, the automatic speech recognition component 510 is configured to convert the audio samples of the audio content 110 into text content 512. The automatic speech recognition component 510 may employ any speech recognition algorithm, including n-gram models, HMMs, RNNs, and connectionist temporal classification (CTC), to convert the audio content 110 into text content 512. In one embodiment, the text sentiment analysis component 540 is configured to determine the underlying emotion(s) 514 of the text content 512. The text sentiment analysis component 540 may employ a variety of text sentiment analysis techniques to determine the underlying emotion(s) 514. Such techniques may include, for example, support vector machines, rule-based techniques, vector space models, and HMMs.

In one embodiment, the speech emotion recognition component 520 is configured to directly analyze the audio samples of the audio content 110 and determine the underlying emotion(s) 516 of the audio content 110. The speech emotion recognition component 520 may employ a variety of ML techniques (e.g., deep neural networks, convolutional neural networks, attention-based models, and LAS networks) for speech emotion recognition.

In certain embodiments, the emotion classifier 226 may also employ acoustic scene classification to provide additional contextual information. For example, the emotion classifier 226 also includes an acoustic scene classification component 530, which is configured to determine a scene classification(s) 518 for the audio content 110. The acoustic scene classification component 530 may be similar to the acoustic scene classification component 420. The aggregate prediction tool 550 is configured to aggregate the outputs from the text sentiment analysis component 540, speech emotion recognition component 520, the acoustic scene classification component 530, and the audio tag 302 (if available), and compute the prediction variable P(Emotion) 314.

Figure 6:
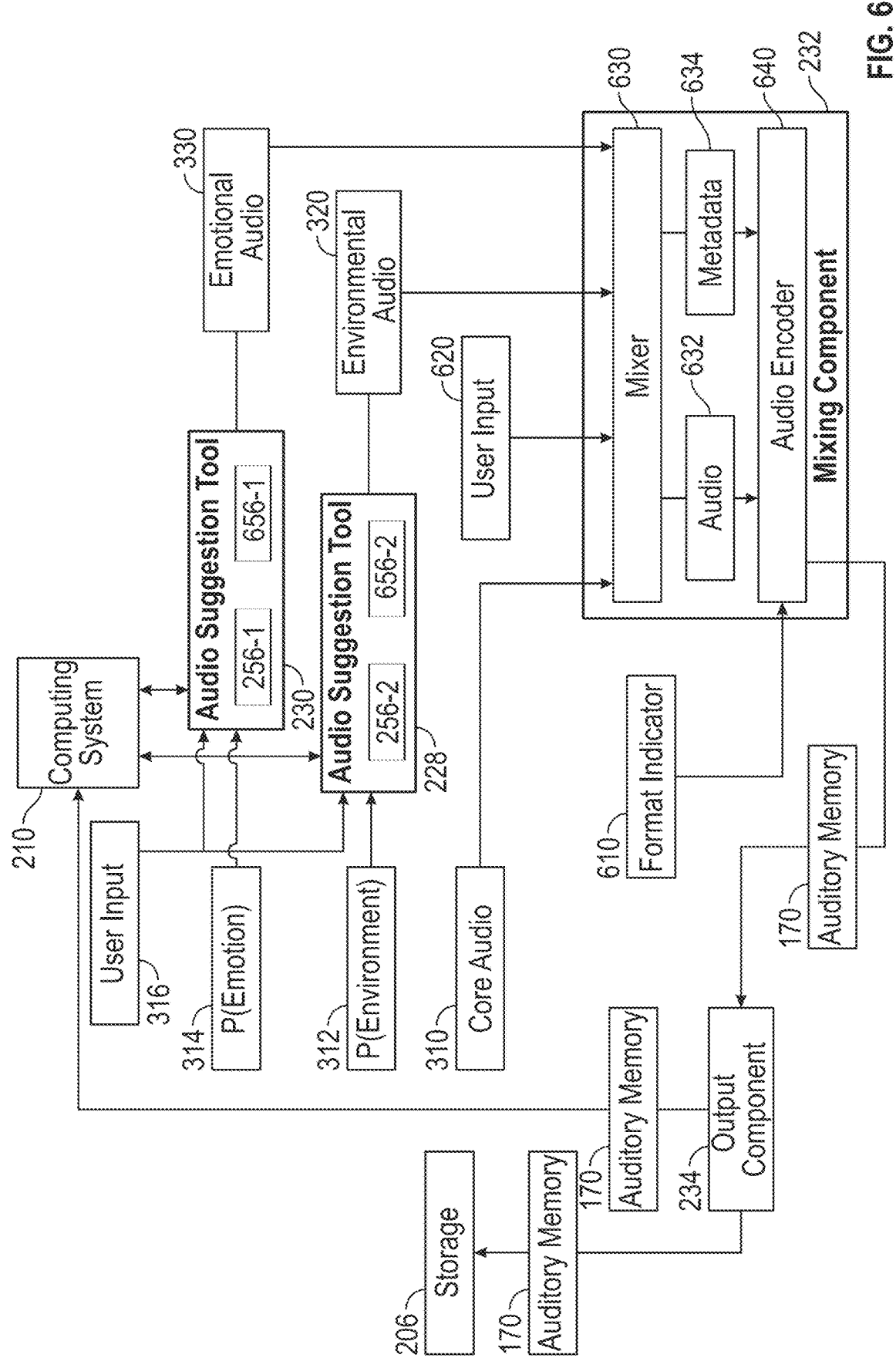
FIG. 6 further illustrates certain components of the workflow illustrated in FIG. 3, according to one embodiment.

FIG. 6 further illustrates certain components of the workflow 300, described relative to FIG. 3, according to one embodiment. As shown, the audio suggestion tools 228, 230 along with the corresponding databases 256 1-2 may be communicatively coupled to the computing system 210 and accessed by a user via an application (e.g., application 220) provided by the computing system 210.

As noted above, the prediction variables P(Emotion) 314 and P(Environment) 312 are used to select and suggests sample sound clips from a sound library database(s) to a user. As shown in FIG. 6, for example, the audio suggestion tool 230 may select a set of sound clips from a sound library database 256-1, based on P(Emotion) 314. The audio suggestion tool 230 may prompt the user to select one of the suggested sound clips and receive the user's selection via user input 316. If the user accepts one of the suggested sound clips, then the audio suggestion tool 230 may output the selected sound clip as emotional audio 330. On the other hand, if the user declines, the audio suggestion tool 230 may prompt the user to select the user's own sound clip or skip. The audio suggestion tool 230 may output the user's own sound clip as emotional audio 330.

Similarly, the audio suggestion tool 228 may select a set of sound clips from a sound library database 256-2, based on P(Environment) 312. The audio suggestion tool 228 may prompt the user to select one of the suggested sound clips and receive the user's selection via user input 316. If the user accepts one of the suggested sound clips, then the audio suggestion tool 228 may output the selected sound clip as environmental audio 320. On the other hand, if the user declines, the audio suggestion tool 228 may prompt the user to select the user's own sound clip or skip. The audio suggestion tool 228 may output the user's own sound clip as environmental audio 320.

As also shown, the mixing component 232 includes a mixer 630 and an audio encoder 640. The mixer 630 is configured to mix the core audio 310, environmental audio 320, and the emotional audio 330 into a mixed audio 632, according to user input 620. For example, the mixing component 232 may provide a user interface via application 220 that allows the user to control and define how the different sounds are combined and rendered. In one example, the user input 620 may include one or more audio panning settings. In another example, the user input 620 may include one or more audio rendering settings.

The mixer 630 provides the mixed audio 632 and metadata 634 to the audio encoder 640, which is configured to generate an encoded audio bit stream, referred to as auditory memory 170. As noted, the auditory memory 170 may be encoded using a standard channel-based encoder (e.g., AAC or MP3) or an object-based format (e.g., MPEG-H). The encoder type may be controlled using a format indicator 610.

The mixing component 232 provides the auditory memory 170 to the output component 234.

The output component 234 is configured to distribute and/or store the auditory memory 170 generated by the mixing component 232. As shown, in one embodiment, the output component 234 sends (e.g., uploads) the auditory memory 170 to the computing system 210. In another embodiment, in addition to or as an alternative to sending the auditory memory 170 to the computing system 210, the output component 234 stores the auditory memory 170 in a storage system 206.

Figure 7:
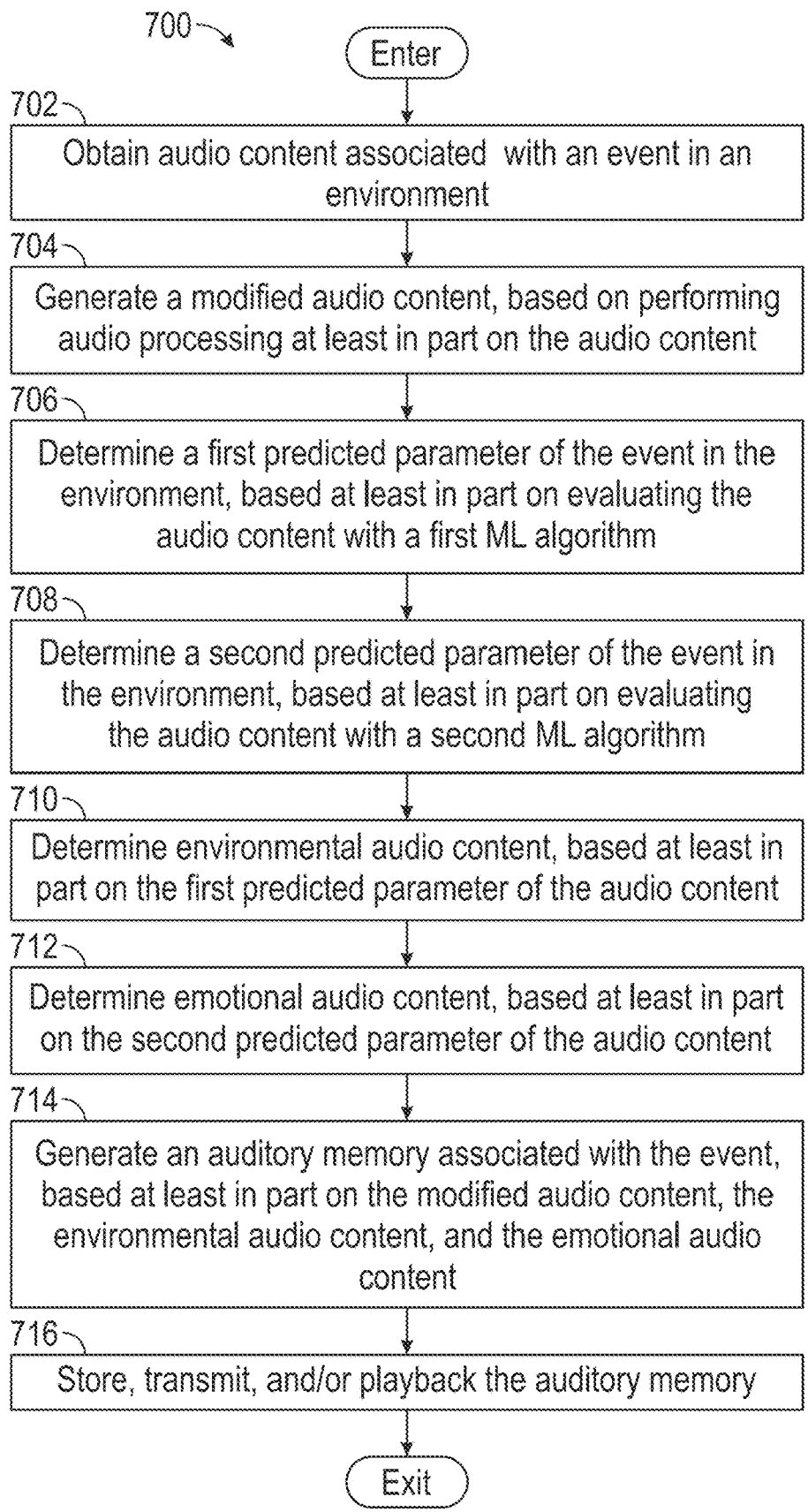
FIG. 7 is a flowchart of a method for generating an auditory memory, according to one embodiment.

FIG. 7 is a flowchart of a method 700 for generating an auditory memory 170 for an auditory event (e.g., audio content 110 associated with an event 120). The method 700 may be performed by an auditory memory generator (e.g., auditory memory generator 152).

Method 700 may enter at block 702, where the auditory memory generator obtains audio content (e.g., audio content 110) associated with an event (e.g., event 120) in an environment (e.g., environment 100A). At block 704, the auditory memory generator generates a modified audio content (e.g., core audio 310), based on performing audio processing at least in part on the audio content.

At block 706, the auditory memory generator determines a first predicted parameter of the event in the environment (e.g., P(Environment) 312), based at least in part on evaluating the audio content with a first ML algorithm. At block 708, the auditory memory generator determines a second predicted parameter of the event in the environment (e.g., P(Emotion) 314), based at least in part on evaluating the audio content with a second ML algorithm.

At block 710, the auditory memory generator determines environmental audio content (e.g., environmental audio 320), based at least in part on the first predicted parameter of the audio content. In one embodiment, the auditory memory generator determines the environmental audio content by: (i) obtaining one or more audio clips from a storage system (e.g., sound library database 256-2) that are associated with the first predicted parameter, (ii) presenting the one or more audio clips on a user interface of a computing device, (iii) determining that one of the presented audio clips has been selected, and (iv) using the selected audio clip as the environmental audio content.

At block 712, the auditory memory generator determines emotional audio content (e.g., emotional audio 330), based at least in part on the second predicted parameter of the audio content. In one embodiment, the auditory memory generator determines the emotional audio content by: (i) obtaining one or more audio clips from a storage system (e.g., sound library database 256-1) that are associated with the second predicted parameter, (ii) presenting the one or more audio clips on a user interface of a computing device, (iii) determining that one of the presented audio clips has been selected, and (iv) using the selected audio clip as the emotional audio content.

At block 714, the auditory memory generator generates an auditory memory (e.g., auditory memory 170) associated with the event, based at least in part on the modified audio content, the environmental audio content, and the emotional audio content. At block 716, the auditory memory generator stores, transmits, and/or playbacks the auditory memory.

Figure 8:
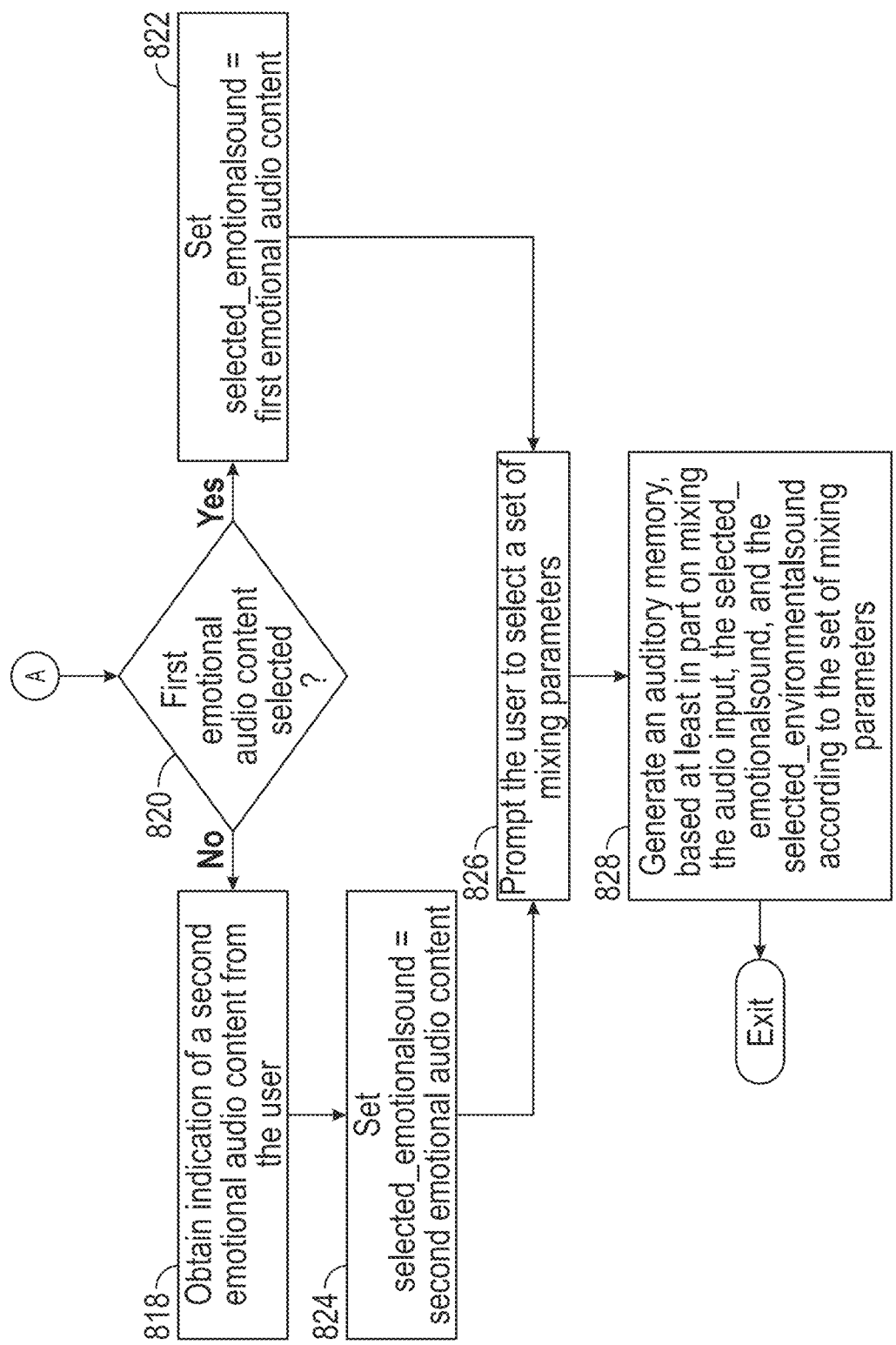
FIG. 8 is a flowchart of a method for interacting with a user to generate an auditory memory, according to one embodiment.

FIG. 8 is a flowchart of a method 800 for interacting with a user to generate an auditory memory 170 for an auditory event (e.g., audio content 110 associated with an event 120). The method 800 may be performed by an auditory memory generator (e.g., auditory memory generator 152).

Method 800 may enter at block 802, where the auditory memory generator obtains audio content (e.g., audio content 110) associated with an event (e.g., event 120). At block 804, the auditory memory generator prompts a user to tag the audio content. For example, the auditory memory generator may use the tagging component 242 to prompt the user to provide one or more audio tags 302.

At block 806, the auditory memory generator prompts the user to select a first environmental audio content. For example, the first environmental audio content may be an audio clip suggested by the audio suggestion tool 228, based on an environment prediction variable P(Environment) 312. At block 808, the auditory memory generator determines whether the first environmental audio content is selected. If the first environmental audio content is selected, then the method 800 proceeds to block 814, where selected_Environmentalsound=first environmental audio content. On the other hand, if the first environmental audio content is not selected, then the method 800 proceeds to block 810, where the auditory memory generator obtains an indication of a second environmental audio content from the user. At block 812, selected_Environmentalsound=second environmental audio content.

At block 816, the auditory memory generator prompts the user to select a first emotional audio content. For example, the first emotional audio content may be an audio clip suggested by the audio suggestion tool 230, based on an emotional prediction variable P(Emotion) 214. At block 820, the auditory memory generator determines whether the first emotional audio content is selected. If the first emotional audio content is selected, then the method 800 proceeds to block 822, where selected_Emotionalsound=first emotional audio content. On the other hand, if the first emotional audio content is not selected, then the method 800 proceeds to block 818, where the auditory memory generator obtains an indication of a second emotional audio content from the user. At block 824, selected_Emotionalsound= second emotional audio content.

At block 826, the auditory memory generator prompts the user to select a set of mixing parameters. The mixing parameters may include at least one of an audio panning setting, an equalization setting, a fading setting, a delay setting, or an indication of playback device. At block 828, the auditory memory generator generates an auditory memory, based at least in part on mixing the audio input, the selected_Emotionalsound, and the selected_Environmentalsound, according to the set of mixing parameters.

FIGS. 9A-9F illustrate example user interfaces (UIs) that may be provided by an application (e.g., application 220) for display on a computing device (e.g., computing device 150) for generating an auditory memory (e.g., auditory memory 170) for an auditory event, according to one embodiment.

Figure 9A:
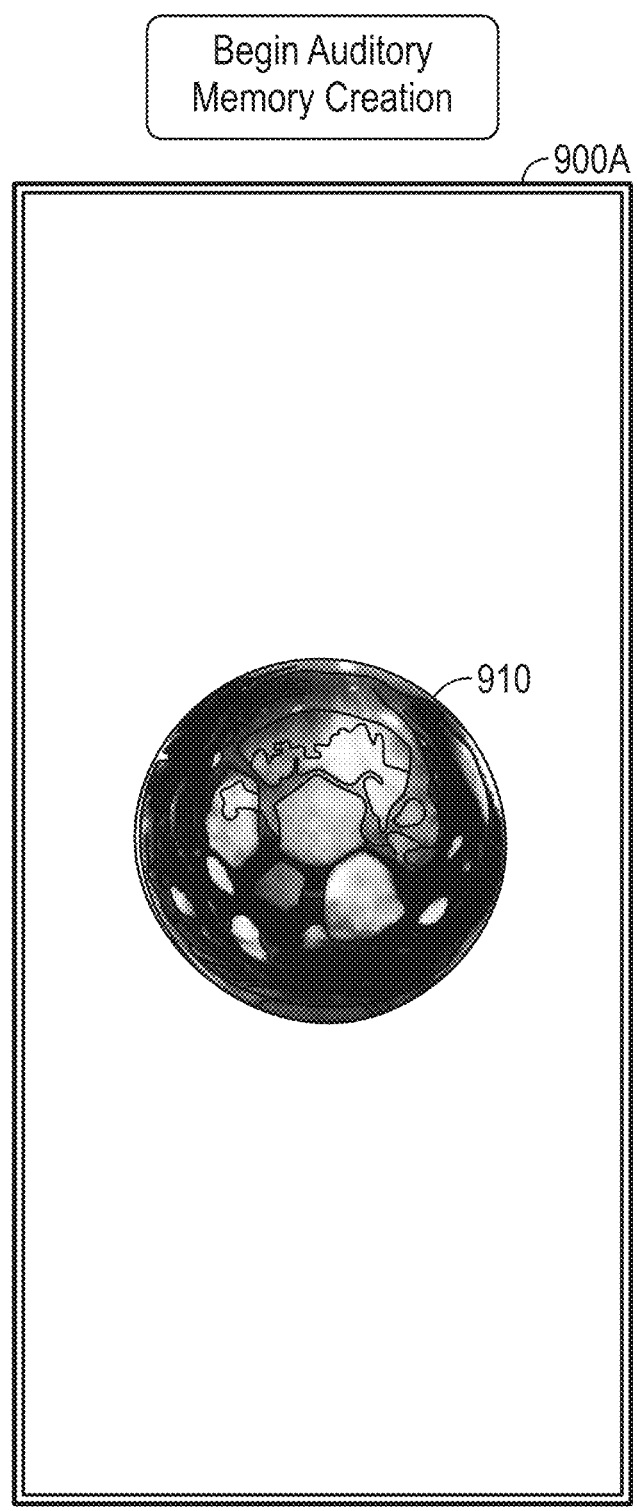
FIG. 9A, FIG. 9B, FIG. 9C, FIG. 9D, FIG. 9E, and FIG. 9F illustrate example user interfaces for display on a computing device for generating an auditory memory, according to one embodiment.
Figure 9B:
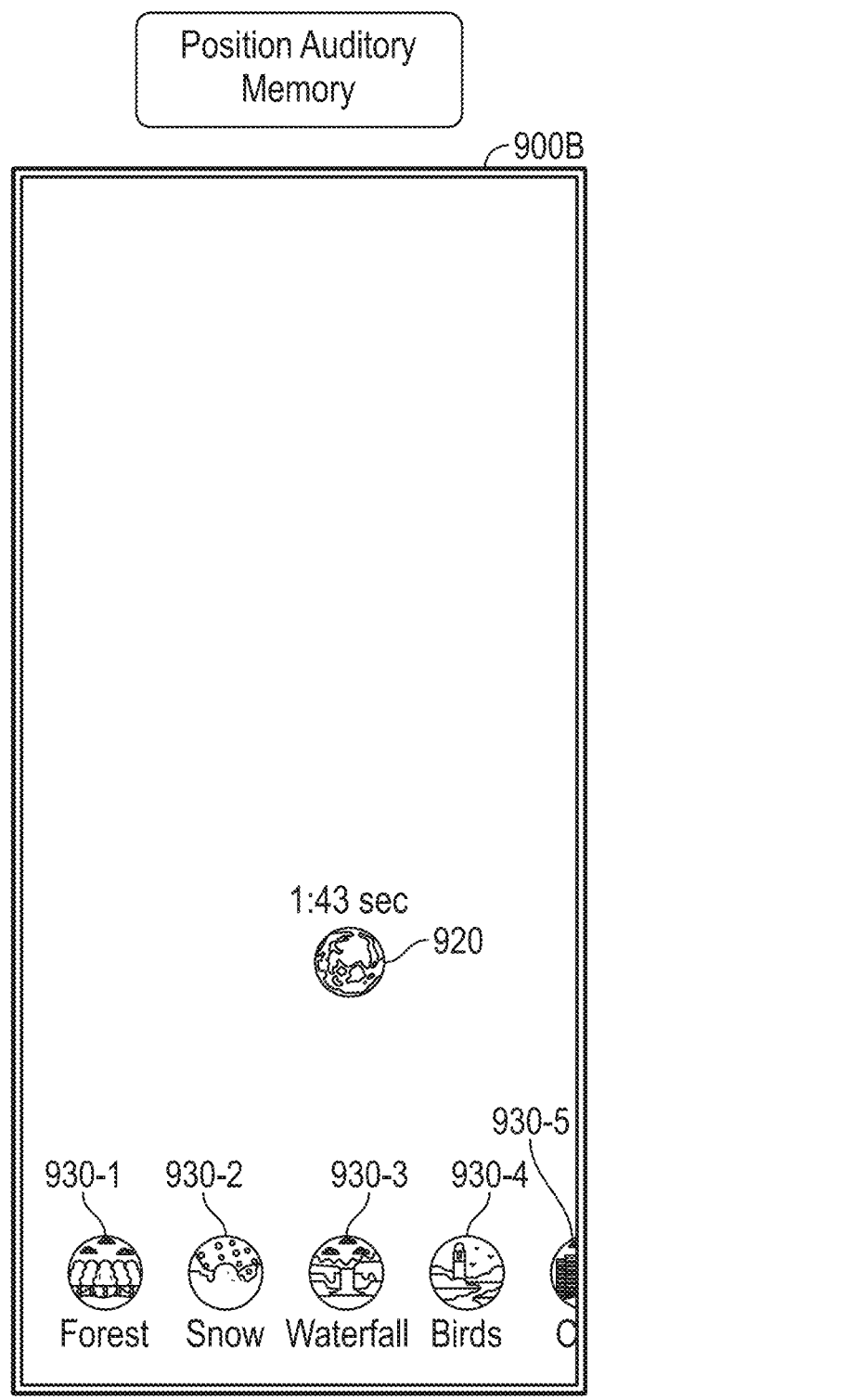

In certain embodiments, the application may initiate the auditory memory generation with the UI 900A. For example, in FIG. 9A, the UI 900A displays a prompt 910 that allows the user to begin the auditory memory creation. In one embodiment, the prompt 910 may allow the user to search, browse, and select a previously recorded audio content from a storage system. Once the auditory memory workflow is initiated, the application may allow the user to position the auditory memory. As shown in FIG. 9B, the UI 900B displays an element 920, which allows the user to choose a particular time instance or time sequence of the audio content to augment with additional audio content. The UI 900B also displays one or more elements 930, each of which is representative of a different audio clip associated with a different environment. For example, element 930-1 is representative of an audio clip associated with a "forest" environment, element 930-2 is representative of an audio clip associated with a "snow" environment, element 930-3 is representative of an audio clip associated with a "waterfall" environment, element 930-4 is representative of an audio clip associated with a "birds" environment, and element 930-5 is representative of an audio clip associated with a "city" environment.

Figure 9C:
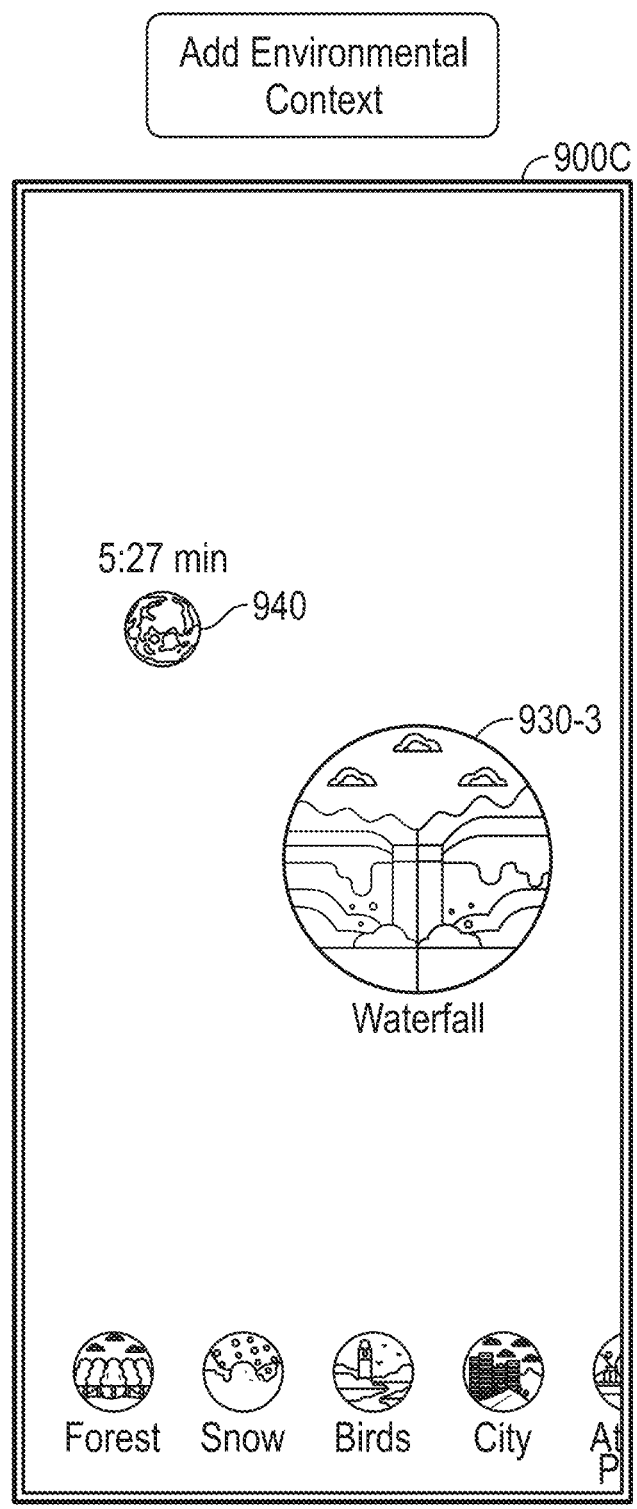

The application may prompt the user to select an audio clip associated with a predicted environment for the audio content. For example, as shown in FIG. 9C, the UI 900C prompts the user to select the element 930-3, which is representative of an audio clip associated with a "waterfall" environment. In certain embodiments, the application may prompt the user to select different audio clips associated with different environments for different portions of the audio content. That is, the application may suggest a first audio clip associated with a first environment for a first portion of the audio content and may suggest a second audio clip associated with a second environment for a second portion of the audio content. In the example depicted in FIG. 9C, the suggested element 930-3 may correspond to a predicted environment for the time instance of the audio content indicated by the element 940.

Figure 9D:
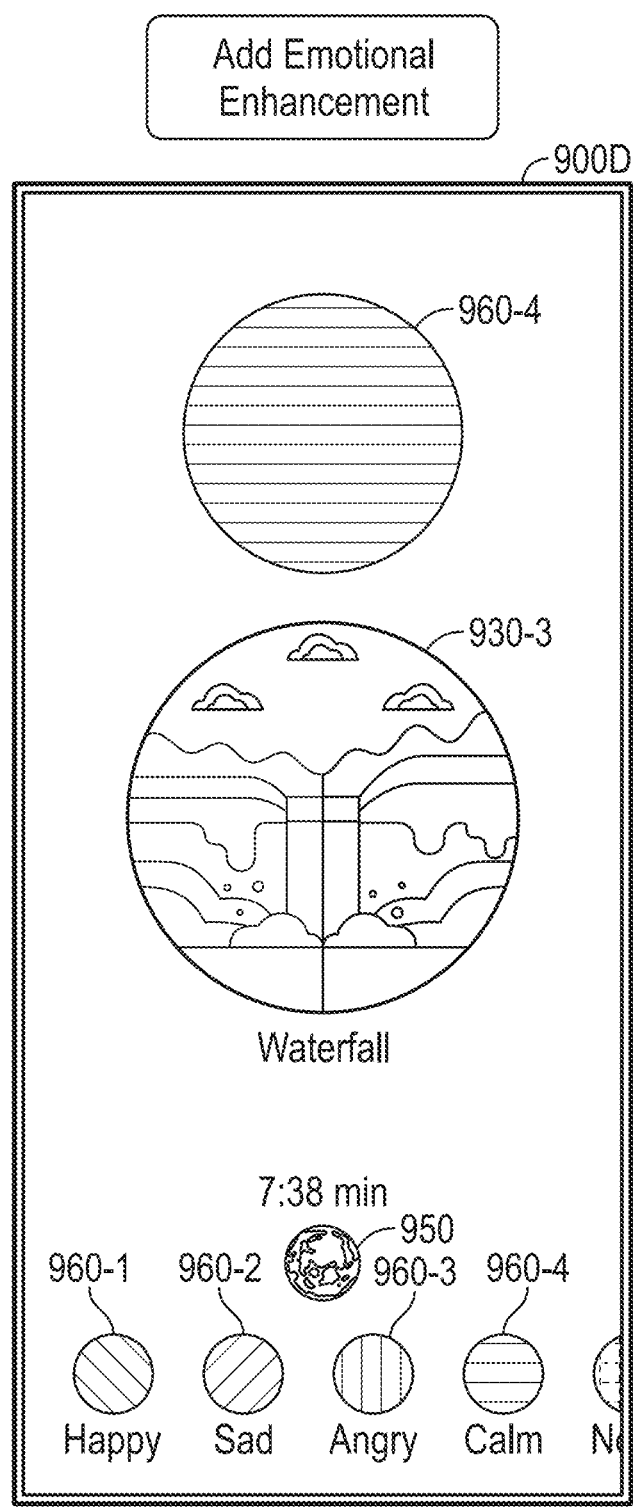

The application may also prompt the user to select an audio clip associated with a predicted underlying emotion for the audio content. As shown in FIG. 9D, The UI 900D displays one or more elements 960, each of which is representative of a different audio clip associated with a different emotion. For example, element 960-1 is representative of an audio clip associated with a "happy" emotion, element 960-2 is representative of an audio clip associated with a "sad" emotion, element 960-3 is representative of an audio clip associated with an "angry" emotion, and element 960-4 is representative of an audio clip associated with a "calm" emotion. In certain embodiments, the application may prompt the user to select different audio clips associated with different emotions for different portions of the audio content. Here, the UI 900D prompts the user to select the element 960-4, which is representative of an audio clip associated with a "calm" emotion for the time instance of the audio content indicated by the element 950.

Figure 9E:
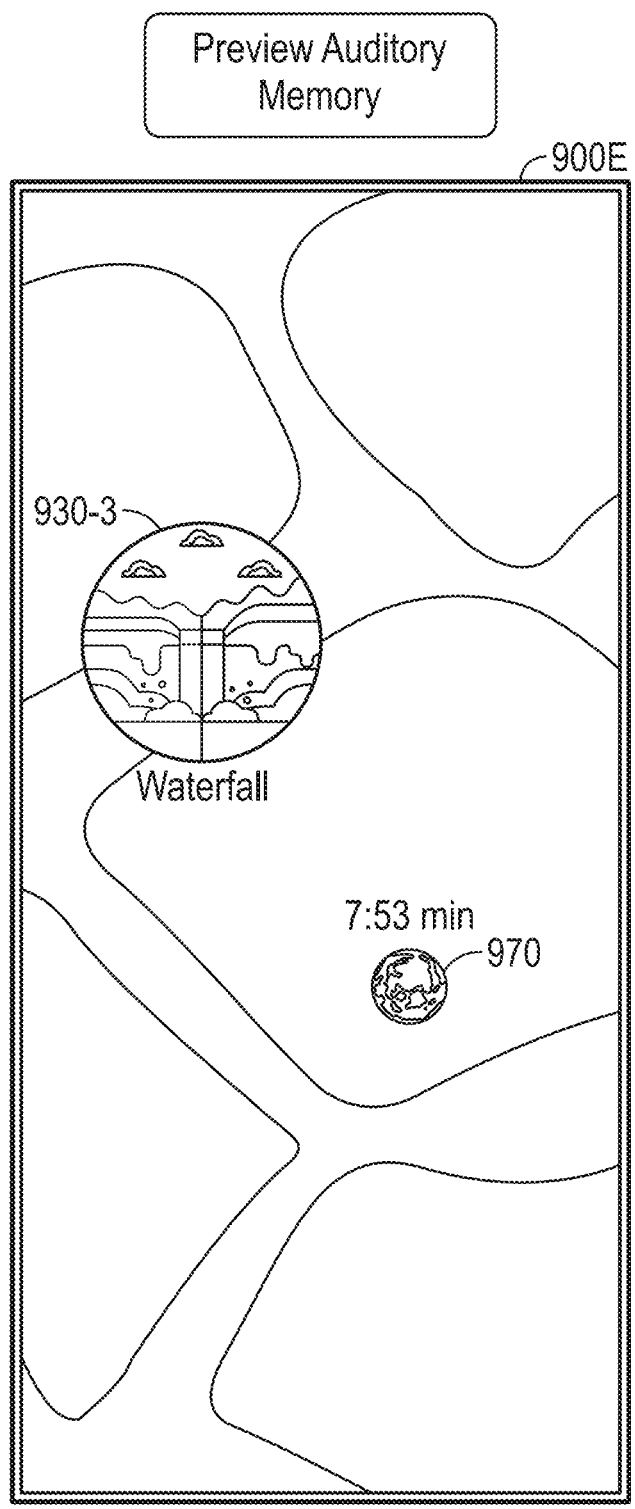
Figure 9F:
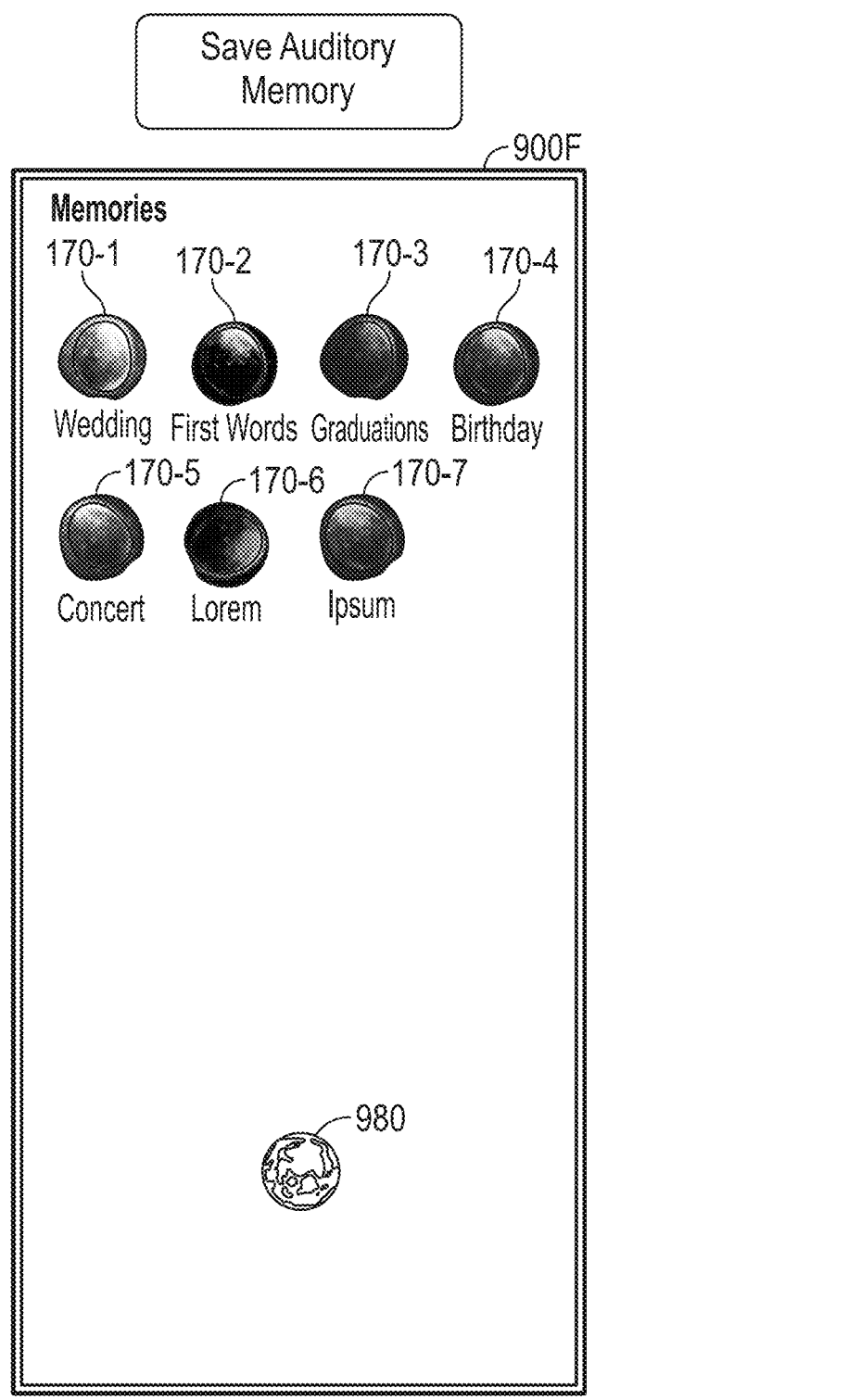

The application may also allow the user the preview different portions of the auditory memory. For example, as shown in FIG. 9E, the user may use the element 970 to choose a particular time instance to preview the audio clip represented by the element 930-3. The application may also allow the user to save the auditory memory. For example, as shown in FIG. 9F, the UI 900F allows the user to save the newly generated auditory memory 980 into a set of saved auditory memories 170 1-7.

Figure 10A:
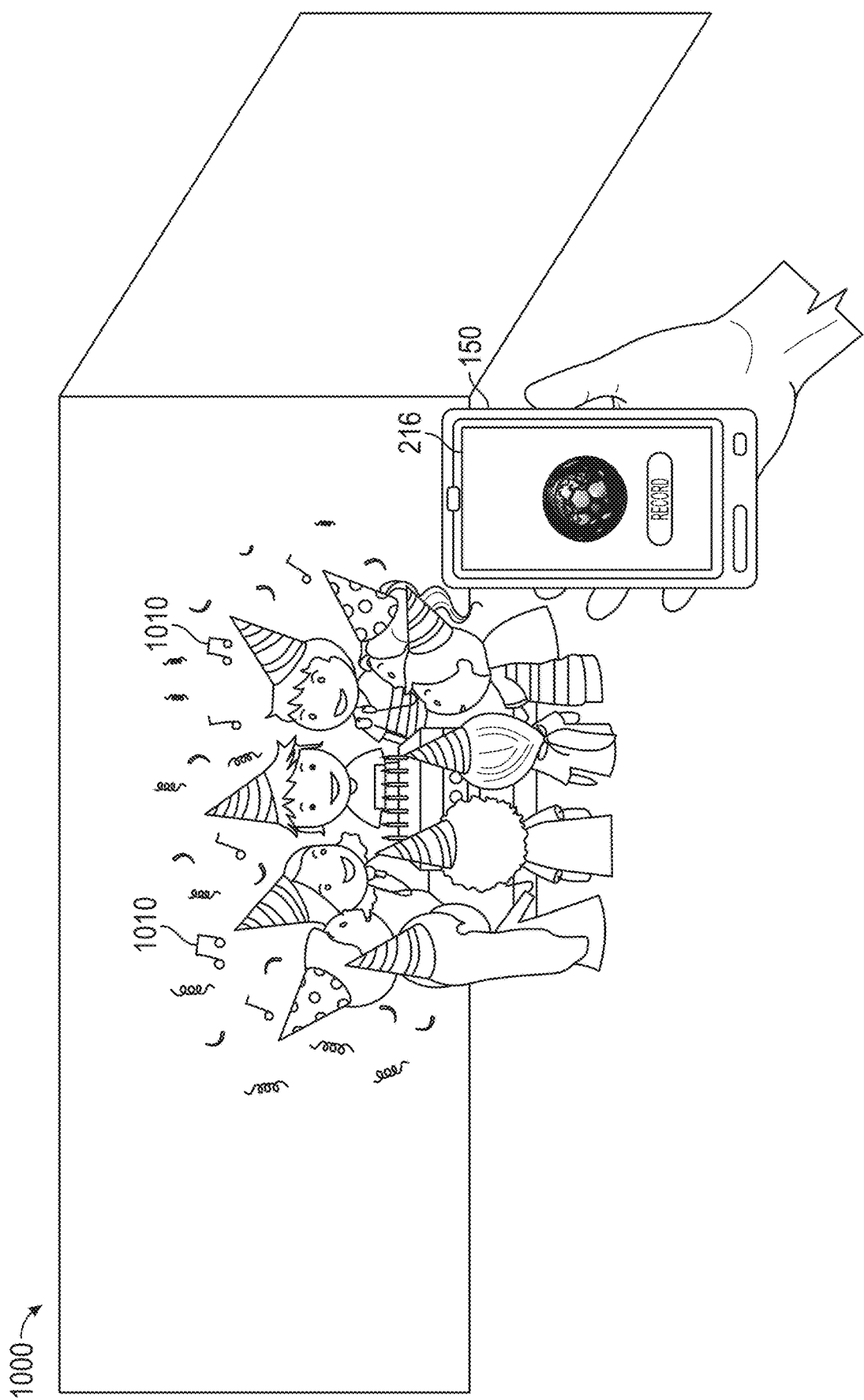
Figure 10C:
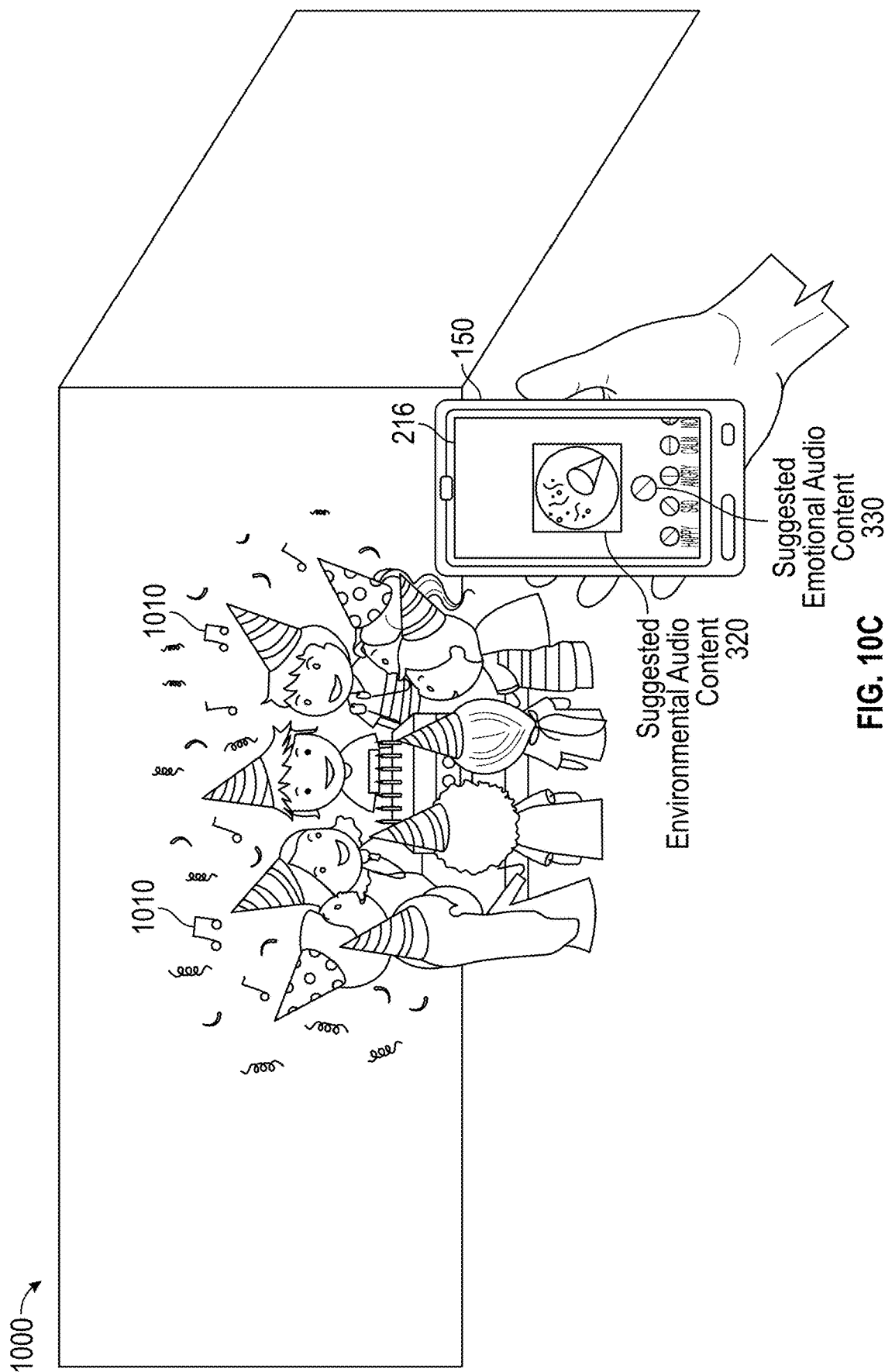
Figure 10D:
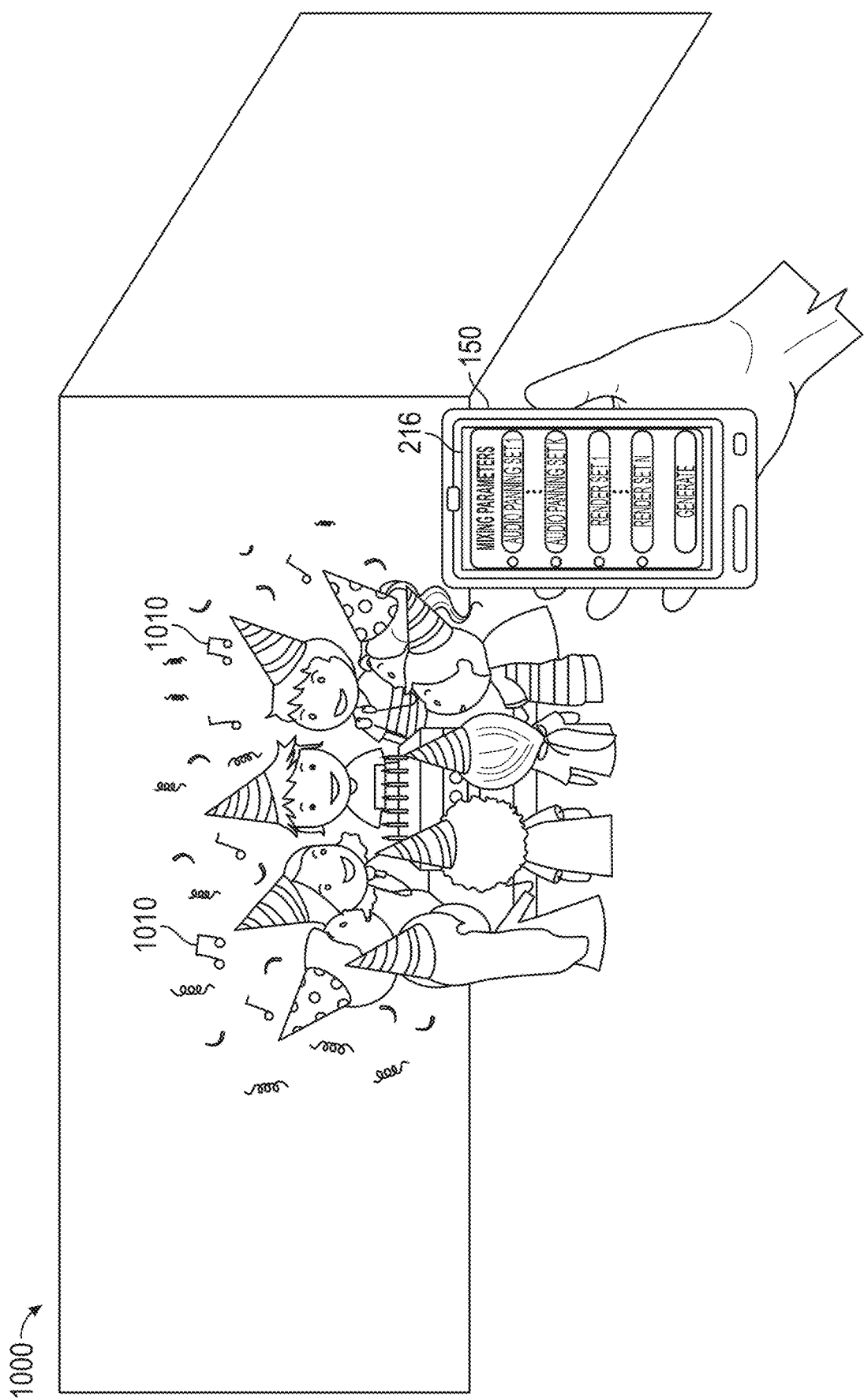

FIGS. 10A-10D illustrate an example scenario in which an auditory memory is generated for an auditory event, according to one embodiment. As shown in FIG. 10A, a user may use a computing device 150 to record a birthday party event in the environment 1000. For example, the screen 216 of the computing device 150 displays a prompt that allows the user to record the audio content 1010 of the birthday party event and initiate an auditory memory generation. As shown in FIG. 10B, the user is presented with a suggested environmental audio content 320 (e.g., "party" audio clip) for the audio content 1010. Additionally, as shown in FIG. 10C, the user is presented with a suggested emotional audio content 330 (e.g., "happy" audio clip) for the audio content 1010. As shown in FIG. 10D, the user is presented with a set of mixing parameters (e.g., audio panning settings and rendering settings) for controlling how the different audio content is mixed.

Advantageously, embodiments described herein can allow a user to create and archive a unique recording of a specific event as an "auditory memory" so that the user can re-experience the specific event at a later time and/or within a different environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method performed by a computing device, comprising:
    obtaining a first audio content, wherein the first audio content is associated with an event in an environment;
    determining at least one attribute of the environment, based on evaluating the first audio content with a first machine learning (ML) algorithm;
    determining at least one emotional attribute associated with the event in the environment, based on evaluating the first audio content with a second ML algorithm;
    determining a second audio content, based at least in part on the at least one attribute of the environment;
    determining a third audio content, based at least in part on the at least one emotional attribute; and
    generating an auditory memory comprising fourth audio content associated with the event in the environment, based on the first audio content, the second audio content, and the third audio content.

2. The computer-implemented method of claim 1, wherein obtaining the first audio content comprises:
    obtaining fifth audio content associated with the event in the environment; and
    performing audio processing on the fifth audio content to obtain the first audio content.

3. The computer-implemented method of claim 1, wherein determining the second audio content comprises:
    obtaining a plurality of audio content from a storage system, the plurality of audio content comprising the second audio content and being associated with the at least one attribute of the environment;
    presenting the plurality of audio content on a user interface of the computing device; and
    determining that the second audio content has been selected from the plurality of audio content on the user interface.

4. The computer-implemented method of claim 1, wherein determining the second audio content comprises:
    generating, based on evaluating the at least one attribute of the environment with a generative audio model, a plurality of audio content associated with the at least one attribute of the environment;
    presenting the plurality of audio content on a user interface of the computing device; and
    determining that the second audio content has been selected from the plurality of audio content on the user interface.

5. The computer-implemented method of claim 1, wherein determining the third audio content comprises:
    obtaining a plurality of audio content from a storage system, the plurality of audio content comprising the third audio content and being associated with the at least one emotional attribute;
    presenting the plurality of audio content on a user interface of the computing device; and
    determining that the third audio content has been selected from the plurality of audio content on the user interface.

6. The computer-implemented method of claim 1, wherein determining the third audio content comprises:
    generating, based on evaluating the at least one emotional attribute with a generative audio model, a plurality of audio content associated with the at least one emotional attribute;
    presenting the plurality of audio content on a user interface of the computing device; and
    determining that the third audio content has been selected from the plurality of audio content on the user interface.

7. The computer-implemented method of claim 1, wherein generating the auditory memory comprises:
generating a mixed audio content, based on mixing the first audio content, the second audio content, and the third audio content according to a set of mixing parameters; and
generating the fourth audio content, based on encoding the mixed audio content according to a set of encoding parameters.

8. The computer-implemented method of claim 7, further comprising providing one or more elements within a user interface of the computing device that allow a user of the computing device to control at least one of (i) the set of mixing parameters or (ii) the set of encoding parameters.

9. The computer-implemented method of claim 7, wherein the set of mixing parameters comprises at least one of (i) an audio panning setting, (ii) an equalization setting, (iii) a fading setting, (iv) a delay setting, or (v) an indication of a playback device.

10. The computer-implemented method of claim 9, wherein the playback device is a wearable device or a speaker device.

11. The computer-implemented method of claim 7, wherein:
the set of encoding parameters comprises a type of encoding format; and
the type of encoding format is a channel-based encoding format or an object-based encoding format.

12. A computing device comprising:
a processor; and
a memory storing instructions, which, when executed on the processor perform an operation comprising:
obtaining a first audio content, wherein the first audio content is associated with an event in an environment;
determining at least one attribute of the environment, based on evaluating the first audio content with a first machine learning (ML) algorithm;
determining at least one emotional attribute associated with the event in the environment, based on evaluating the first audio content with a second ML algorithm;
determining a second audio content, based at least in part on the at least one attribute of the environment;
determining a third audio content, based at least in part on the at least one emotional attribute; and
generating an auditory memory comprising fourth audio content associated with the event in the environment, based on the first audio content, the second audio content, and the third audio content.

13. The computing device of claim 12, wherein obtaining the first audio content comprises:
obtaining fifth audio content associated with the event in the environment; and
performing audio processing on the fifth audio content to obtain the first audio content.

14. The computing device of claim 12, wherein determining the second audio content comprises:
obtaining a plurality of audio content from a storage system, the plurality of audio content comprising the second audio content and being associated with the at least one attribute of the environment;
presenting the plurality of audio content on a user interface of the computing device; and
determining that the second audio content has been selected from the plurality of audio content on the user interface.

15. The computing device of claim 12, wherein determining the third audio content comprises:
obtaining a plurality of audio content from a storage system, the plurality of audio content comprising the third audio content and being associated with the at least one emotional attribute;
presenting the plurality of audio content on a user interface of the computing device; and
determining that the third audio content has been selected from the plurality of audio content on the user interface.

16. The computing device of claim 12, wherein generating the auditory memory comprises:
generating a mixed audio content, based on mixing the first audio content, the second audio content, and the third audio content according to a set of mixing parameters; and
generating the fourth audio content, based on encoding the mixed audio content according to a set of encoding parameters.

17. The computing device of claim 16, the operation further comprising providing one or more elements within a user interface of the computing device that allow a user of the computing device to control at least one of (i) the set of mixing parameters or (ii) the set of encoding parameters.

18. The computing device of claim 16, wherein the set of mixing parameters comprises at least one of (i) an audio panning setting, (ii) an equalization setting, (iii) a fading setting, (iv) a delay setting, or (v) an indication of a playback device.

19. The computing device of claim 16, wherein:
the set of encoding parameters comprises a type of encoding format; and
the type of encoding format is a channel-based encoding format or an object-based encoding format.

20. A non-transitory computer-readable medium comprising computer executable code, which when executed by one or more processors, performs an operation comprising:
obtaining a first audio content, wherein the first audio content is associated with an event in an environment;
determining at least one attribute of the environment, based on evaluating the first audio content with a first machine learning (ML) algorithm;
determining at least one emotional attribute associated with the event in the environment, based on evaluating the first audio content with a second ML algorithm;
determining a second audio content, based at least in part on the at least one attribute of the environment;
determining a third audio content, based at least in part on the at least one emotional attribute; and
generating an auditory memory comprising fourth audio content associated with the event in the environment, based on the first audio content, the second audio content, and the third audio content.

* * * * *